(12) United States Patent
Bruner et al.

(10) Patent No.: US 8,001,321 B2
(45) Date of Patent: Aug. 16, 2011

(54) DIGITAL DEVICE CONFIGURATION AND METHOD

(75) Inventors: Curtis H. Bruner, Longmont, CO (US);
John F. Fletcher, Longmont, CO (US);
Frida E. R. Fletcher, Longmont, CO (US)

(73) Assignee: Benhov GmbH, LLC, Wilmington, DE (US)

( * ) Notice: Subject to any disclaimer, the term of this patent is extended or adjusted under 35 U.S.C. 154(b) by 0 days.

(21) Appl. No.: 11/100,743

(22) Filed: Apr. 7, 2005

(65) Prior Publication Data

US 2005/0182875 A1 Aug. 18, 2005

Related U.S. Application Data

(62) Division of application No. 09/952,998, filed on Sep. 14, 2001, now Pat. No. 7,106,541.

(51) Int. Cl.
*G06F 13/14* (2006.01)
*G06F 12/00* (2006.01)

(52) U.S. Cl. ............... 711/111; 710/5; 710/74; 711/112

(58) Field of Classification Search .................. None
See application file for complete search history.

(56) References Cited

U.S. PATENT DOCUMENTS

| | | | |
|---|---|---|---|
| 4,773,004 A | 9/1988 | Gershenson et al. |
| 4,933,785 A | 6/1990 | Morehouse et al. |
| 4,980,786 A | 12/1990 | O'Sullivan et al. |
| 5,014,237 A | 5/1991 | Masters et al. |
| 5,030,260 A | 7/1991 | Beck et al. |
| 5,051,868 A | 9/1991 | Leverault et al. |
| 5,075,805 A | 12/1991 | Peddle et al. |
| 5,253,129 A | 10/1993 | Blackborow et al. |
| 5,261,058 A | 11/1993 | Squires et al. |
| 5,274,773 A | 12/1993 | Squires et al. |
| 5,289,325 A | 2/1994 | Morehouse et al. |
| 5,337,414 A | 8/1994 | Hashemi et al. |
| 5,379,171 A | 1/1995 | Morehouse et al. |

(Continued)

FOREIGN PATENT DOCUMENTS

JP 08-123731 5/1996

(Continued)

OTHER PUBLICATIONS

Peter T. McLean, Information Technology—AT Attachment with Packet Interface Extension (ATA/ATAPI-4), Aug. 19, 1998, Maxtor Corporation.

(Continued)

*Primary Examiner* — Gary J Portka
(74) *Attorney, Agent, or Firm* — Perkins Coie LLP

(57) ABSTRACT

A digital Storage Element is described. A device is configured including a Storage Element for access by a user responsive to a native control code. A processing arrangement executes a control program for controlling the overall device and executing at least a portion of the native control code as part of the control program for interfacing with the Storage Element. A programming arrangement is provided separate from the device for customizing a read channel within the Storage Element. Command, user interaction and data transfer execution are discussed for mitigation of potential mechanical shock effects. Status indications relating to the Storage Element are provided including head position and mechanical shock. Calibration, test and operational monitoring procedures, for using head position status, are described. Failure configuration monitoring is provided in tracking overall performance and design considerations.

41 Claims, 14 Drawing Sheets

U.S. PATENT DOCUMENTS

| | | | |
|---|---|---|---|
| 5,442,266 | A | 8/1995 | Morehouse et al. |
| 5,455,723 | A | 10/1995 | Boutaghou et al. |
| 5,491,395 | A | 2/1996 | Hutsell et al. |
| 5,587,854 | A | 12/1996 | Sato et al. |
| 5,594,600 | A | 1/1997 | Bruner et al. |
| 5,610,808 | A | 3/1997 | Squires et al. |
| 5,625,792 | A | 4/1997 | Kitani |
| 5,627,990 | A | 5/1997 | Cord et al. |
| 5,640,286 | A | 6/1997 | Acosta et al. |
| 5,677,813 | A | 10/1997 | Yoshida et al. |
| 5,680,293 | A | 10/1997 | McAnally et al. |
| 5,706,168 | A | 1/1998 | Erler et al. |
| 5,753,980 | A | 5/1998 | Peterson |
| 5,760,986 | A | 6/1998 | Morehouse et al. |
| 5,760,998 | A | 6/1998 | Berberich et al. |
| 5,793,566 | A | 8/1998 | Scura et al. |
| 5,889,629 | A | 3/1999 | Patton, III |
| 5,914,828 | A | 6/1999 | Bruner et al. |
| 5,969,905 | A | 10/1999 | Iwamoto et al. |
| 5,974,544 | A | 10/1999 | Jeffries et al. |
| 5,987,542 | A | 11/1999 | Bang |
| 5,995,330 | A | 11/1999 | Furay et al. |
| 6,005,747 | A | 12/1999 | Gilovich |
| 6,015,196 | A | 1/2000 | Welsh et al. |
| 6,052,258 | A | 4/2000 | Albrecht et al. |
| 6,057,987 | A | 5/2000 | Furay et al. |
| 6,061,751 | A | 5/2000 | Bruner et al. |
| 6,139,177 | A * | 10/2000 | Venkatraman et al. .......... 700/83 |
| 6,144,532 | A | 11/2000 | Khan et al. |
| 6,178,056 | B1 | 1/2001 | Cloke et al. |
| 6,219,787 | B1 * | 4/2001 | Brewer .......................... 713/167 |
| 6,229,663 | B1 | 5/2001 | Yoneda et al. |
| 6,236,527 | B1 | 5/2001 | Uchiike et al. |
| 6,260,106 | B1 | 7/2001 | Vogley |
| 6,269,449 | B1 | 7/2001 | Kocis |
| 6,278,568 | B1 | 8/2001 | Cloke et al. |
| 6,301,637 | B1 | 10/2001 | Krull et al. |
| 6,304,440 | B1 | 10/2001 | Lin |
| 6,308,961 | B1 | 10/2001 | Kunikane et al. |
| 6,313,961 | B1 | 11/2001 | Armstrong et al. |
| 6,314,331 | B1 * | 11/2001 | D'Agosto, III .................. 700/94 |
| 6,321,979 | B1 | 11/2001 | Hanagata |
| 6,330,209 | B1 | 12/2001 | Hatam-Tabrizi |
| 6,369,988 | B1 | 4/2002 | Yoshida et al. |
| 6,377,530 | B1 | 4/2002 | Burrows |
| 6,411,452 | B1 | 6/2002 | Cloke |
| 6,415,349 | B1 | 7/2002 | Hull et al. |
| 6,424,480 | B1 | 7/2002 | Bhandari et al. |
| 6,445,587 | B1 | 9/2002 | Pavol |
| 6,449,115 | B1 | 9/2002 | Maki |
| 6,480,349 | B1 | 11/2002 | Kim et al. |
| 6,490,114 | B1 | 12/2002 | Gill et al. |
| 6,496,275 | B1 | 12/2002 | Kurashina |
| 6,496,319 | B1 | 12/2002 | Kusumoto et al. |
| 6,502,194 | B1 | 12/2002 | Berman et al. |
| 6,546,456 | B1 | 4/2003 | Smith et al. |
| 6,570,736 | B2 | 5/2003 | Noda |
| 6,594,096 | B2 | 7/2003 | Burns et al. |
| 6,594,716 | B2 | 7/2003 | Nemazie et al. |
| 6,614,614 | B1 | 9/2003 | Murayama et al. |
| 6,631,045 | B1 | 10/2003 | Pedrazzini |
| 6,704,260 | B1 | 3/2004 | Kabasawa et al. |
| 6,735,650 | B1 | 5/2004 | Rothberg |
| 6,791,799 | B2 | 9/2004 | Fletcher |
| 6,910,206 | B1 * | 6/2005 | Nevill ........................... 717/153 |
| 6,941,453 | B2 | 9/2005 | Rao |
| 6,944,854 | B2 | 9/2005 | Kehne et al. |
| 6,973,535 | B2 | 12/2005 | Bruner et al. |
| 6,976,062 | B1 | 12/2005 | Denby et al. |
| 7,106,541 | B2 | 9/2006 | Bruner et al. |
| 7,149,891 | B2 | 12/2006 | Bruner et al. |
| 7,162,577 | B2 | 1/2007 | Bruner et al. |
| 7,162,578 | B2 | 1/2007 | Bruner et al. |
| 7,165,139 | B2 | 1/2007 | Bruner et al. |
| 2001/0012175 | A1 | 8/2001 | Williams et al. |
| 2001/0049210 | A1 | 12/2001 | Pinteric et al. |
| 2002/0043608 | A1 | 4/2002 | Nakata et al. |
| 2002/0071139 | A1 | 6/2002 | Janik |
| 2002/0089774 | A1 | 7/2002 | Veltchev |
| 2002/0126408 | A1 | 9/2002 | Okuyama |
| 2003/0003944 | A1 | 1/2003 | Rosenzweig |
| 2003/0015639 | A1 | 1/2003 | Smith |
| 2005/0066119 | A1 | 3/2005 | Azimi |
| 2005/0195514 | A1 | 9/2005 | Bruner |

FOREIGN PATENT DOCUMENTS

| | | |
|---|---|---|
| JP | 10-500503 | 1/1998 |
| JP | 10-49994 | 2/1998 |
| JP | 10-177764 | 6/1998 |
| JP | 2000-69430 | 3/2000 |
| JP | 2001-067809 | 3/2001 |
| JP | 2003529465 | 6/2009 |
| KR | 1019990077505 | 10/1999 |
| KR | 10-2004-7003841 | 2/2010 |
| WO | 9525298 | 9/1995 |
| WO | PCT/US02/28987 | 5/2003 |
| WO | PCT/US03/38252 | 1/2005 |
| WO | PCT/US04/12554 | 12/2005 |

OTHER PUBLICATIONS

CompactFlash Association, CF+ and CompactFlash Specification Revision 1.4, 1998, CompactFlash Association.

Apple Computer, Apple iPod, Oct. 23, 2001, Apple Computer Website.

IBM, IBM Microdrive, Jun. 15, 1999, IBM Website.

Nomad, Nomad Jukebox, Aug. 1, 2000, Nomadworld Website.

R. W. Clough et al, Dynamics of Structures, Jan. 1975, McGraw Hill, pp. 87-96.

U.S. Appl. No. 09/952,998, Mar. 22, 2004, Restriction Req., Daniell L. Negron.

U.S. Appl. No. 09/952,998, Jul. 29, 2004, Non-Final Rej., Daniell L. Negron.

U.S. Appl. No. 09/952,998, Jun. 29, 2005, Restriction Req., Daniell L. Negron.

U.S. Appl. No. 09/952,998, Oct. 21, 2005, Final Rej., Daniell L. Negron.

U.S. Appl. No. 09/952,998, Jan. 10, 2006, Non-Final Rej., Daniell L. Negron.

U.S. Appl. No. 09/952,998, Feb. 7, 2006, Notice of Allowance, Daniell L. Negron.

U.S. Appl. No. 10/447,544, Dec. 28, 2004, Restriction Req., Gary J. Portka.

U.S. Appl. No. 10/447,544, May 9, 2005, Notice of Allowance, Gary J. Portka.

U.S. Appl. No. 11/073,969, Apr. 3, 2006, Non-Final Rej., Gary J. Portka.

U.S. Appl. No. 11/073,969, Aug. 31, 2006, Notice of Allowance, Gary J. Portka.

U.S. Appl. No. 11/074,104, May 31, 2006, Notice of Allowance, Gary J. Portka.

U.S. Appl. No. 11/074,105, Mar. 31, 2006, Non-Final Rej., Gary J. Portka.

U.S. Appl. No. 11/074,105, Sep. 6, 2006, Notice of Allowance, Gary J. Portka.

U.S. Appl. No. 11/074,154, Apr. 3, 2006, Non-Final Rej., Gary J. Portka.

U.S. Appl. No. 11/074,154, Sep. 1, 2006, Notice of Allowance, Gary J. Portka.

U.S. Appl. No. 11/074,365, Mar. 31, 2006, Non-Final Rej., Gary J. Portka.

U.S. Appl. No. 11/074,365, Aug. 31, 2006, Non-Final Rej., Gary J. Portka.

U.S. Appl. No. 11/074,365, Mar. 21, 2007, Final Rej., Gary J. Portka.

U.S. Appl. No. 11/074,365, Dec. 11, 2007, Non-Final Rej., Gary J. Portka.

U.S. Appl. No. 11/100,657, Nov. 8, 2007, Non-Final Rej., Gary J. Portka.

U.S. Appl. No. 11/100,658, Jan. 31, 2007, Non-Final Rej., Gary J. Portka.

U.S. Appl. No. 11/100,658, Nov. 5, 2007, Final Rej., Gary J. Portka.

U.S. Appl. No. 11/100,744, Oct. 17, 2006, Restriction Req., Daniell L. Negron.
U.S. Appl. No. 11/100,744, Dec. 11, 2006, Non-Final Rej., Daniell L. Negron.
U.S. Appl. No. 11/100,744, Aug. 20, 2007, Final Rej., Daniell L. Negron.
U.S. Appl. No. 11/100,657, Jul. 28, 2008, Final Rejection, Shane M. Thomas.
U.S. Appl. No. 11/100,658, Jul. 17, 2008, Non-Final Rejection, Gary J. Portka.
U.S. Appl. No. 11/100,744, Mar. 31, 2008, Non-Final Rejection, Daniell L. Negron.
U.S. Appl. No. 11/107,365, Sep. 8, 2008, Notice of Allowance, Gary J. Portka.
U.S. Appl. No. 11/100,657, Jan. 12, 2009, Non-Final Rej., Shane M. Thomas.
U.S. Appl. No. 11/100,744, Oct. 30, 2008, Final Rej., Daniell L. Negron.
U.S. Appl. No. 11/100,744, Jan. 27, 2009, Notice of Allowance, Daniell L. Negron.
U.S. Appl. No. 11/100,658, Mar. 11, 2009, Office Action.
U.S. Appl. No. 11/100,657, Jun. 11, 2009, Office Action.
U.S. Appl. No. 11/100,658, Jun. 4, 2009, Notice of Allowance.
U.S. Appl. No. 11/100,658, filed Aug. 3, 2009, Notice of Allowance.
U.S. Appl. No. 11/100,658, filed Sep. 10, 2009, Notice of Allowability.
U.S. Appl. No. 11/100,658, filed Dec. 3, 2009, Notice of Allowance.
U.S. Appl. No. 11/100,658, filed Feb. 24, 2010, Supplemental Notice of Allowability.
U.S. Appl. No. 11/100,658, filed Mar. 10, 2010, Notice of Allowability.
U.S. Appl. No. 11/100,657, Sep. 3, 2009, Notice of Allowance.
U.S. Appl. No. 11/100,657, Oct. 27, 2009, Notice of Allowance.
U.S. Appl. No. 11/100,657, Oct. 28, 2009, Notice of Allowance.

* cited by examiner

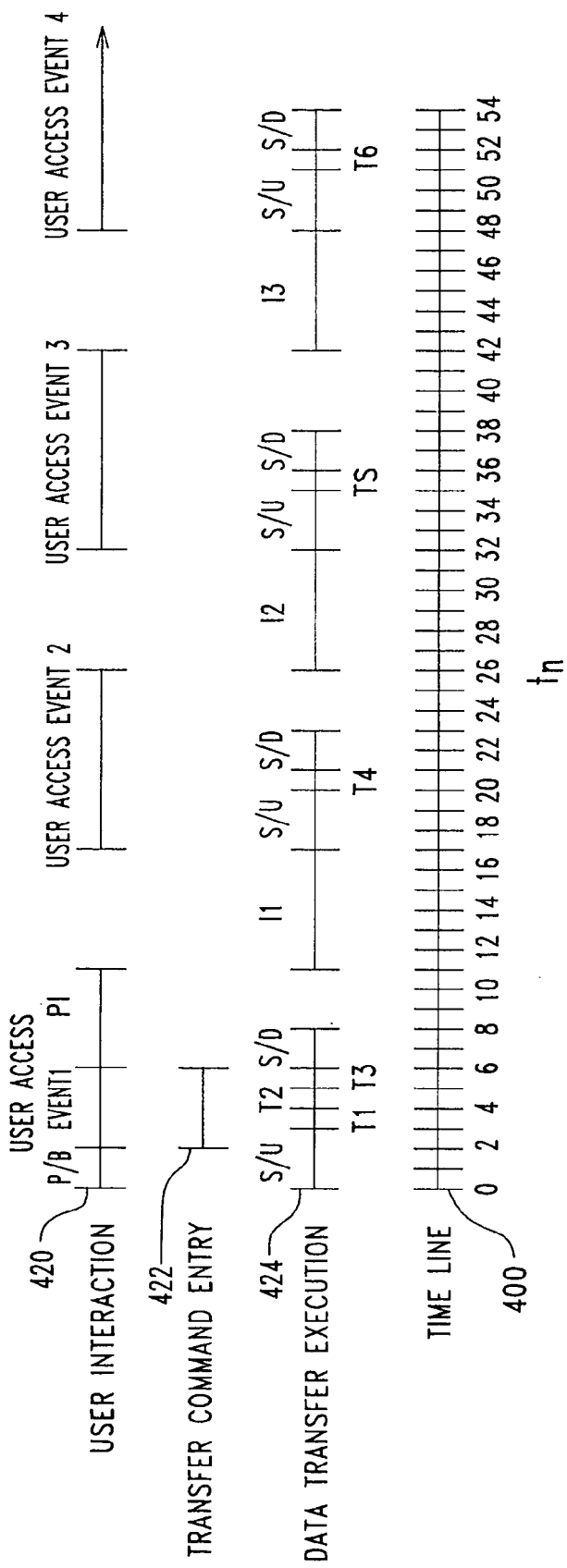

DIGITAL DEVICE CONFIGURATION AND METHOD

The present application is a divisional application of U.S. patent application Ser. No. 09/952,998, filed on Sep. 14, 2001, now U.S. Pat. No. 7,106,541 which is incorporated herein by reference in its entirety.

BACKGROUND OF THE INVENTION

The present invention is related generally to a digital device architecture and, more particularly, to a digital system configuration and associated method for devices including an electromechanical data Storage Element. The invention is particularly well-suited for use in a portable device.

One need only briefly survey virtually any public area in modern society in order to gain an appreciation for the popularity of electronic devices. Such devices include, but are not limited to cellular phones, music players, portable computers, personal digital assistants, pagers, digital cameras, digital camcorders, personal gaming devices and e-books. Continuous improvement has been seen in the capabilities present in these devices attributable, at least in part, to a movement into digital implementations.

Demands, with regard to future electronic devices, include further miniaturization coupled with still further improvements in performance. These demands are markedly intense with regard to portable devices. A particular area of concern resides in a desire to store ever-increasing amounts of digital information. At the same time, it should be appreciated that an electronic device, especially in a portable or miniaturized form, is likely to be subjected to a somewhat harsh environment, particularly with regard to mechanical shock. In an attempt to cope with the need for a significant amount of digital data storage while, at the same time, dealing with the problem of mechanical shock, designers resorted to the use of electronic memory, particularly in the form of flash memory. This solution is evident in the instance of state-of-the-art music players, including MP3 players. As of this writing, the popular configuration of these players is to use a removable flash memory card having a size of approximately 32 MB. Unfortunately, several problems are associated with this solution, as will be described.

One problem seen with regard to the flash memory solution resides in the fact that 32 MB is, in itself, a somewhat limited amount of storage. It is not unforeseeable that in the near future even amounts less than 512 MB will be considered as small. Considering present day devices, the owner of a portable device that relies on the use of flash memory cards typically must own a number of the cards in order to provide a sufficient overall amount of storage. Otherwise, the portable device owner may be forced to frequently reload the flash memory card via a personal computer or otherwise be subjected, for example, to listening to a quite limited music selection in the instance of an MP3 player. Moreover, the cost of flash memory cards is currently somewhat prohibitive. Many portable device owners simply choose not to incur the expense of buying numbers of additional flash memory cards.

In coping with the problems inherent in the use of flash memory cards, a recent alternative solution has been the provision of a larger, electromechanical digital storage arrangement that is nonetheless removable. This solution is exemplified by the IBM Microdrive™. The latter is a removable miniaturized computer hard disk drive provided with a connector that mates with a corresponding connector incorporated within the portable device to be served. It is noted that such miniature hard drives, including the Microdrive, have essentially the same configuration as prior art hard drives seen in personal computers. That is, the miniature hard drive is made up of two general assemblies including a head disk assembly (HDA) and a printed circuit board assembly (PCBA). The HDA itself includes a rotatable magnetic media, a sensor assembly for reading from and writing to the rotatable media and motors for accomplishing rotation of the rotatable media and positioning of the sensor assembly. The PCBA includes essentially all of the electronics needed to operate the HDA with the common exception of a preamplifier. While the Microdrive brings improvement in data capacity, as of this writing, the cost of the Microdrive is quite high in terms of megabytes per dollar and absolute cost when compared to such costs in conventional drives. It is submitted that this absolute cost, in and by itself, will prove to be a significant barrier with regard to broad-based use of the product.

The Microdrive utilizes a CompactFlash interface. This interface raises concerns for a number of reasons, not the least of which is the requirement for a rather bulky interface connector having fifty pins, as described in the CF+ and CompactFlash Specification Revision 1.4. Further concerns with regard to CompactFlash will be addressed below.

With regard to the removable configuration of the Microdrive, it is noted that the perceived need for removable media has been greatly reduced in certain environments once viable, significant levels of "permanently" installed storage space has been provided. Available embedded storage has traditionally taken a precedent over removable storage, as evidenced in desktop computers. Still further concerns are associated with removable storage, as will be discussed below.

While the use of a miniaturized hard disk drive effectively resolves the problem of limited storage by providing many times the storage currently available in a typical flash memory card, the issue of the use of such a component in the potentially harsh environment of a portable device is once again brought to the forefront. It should be appreciated that, under certain circumstances, prior art hard disk drives tolerate relatively high levels of mechanical shock—even as high as 1500 Gs. Under operational circumstances, unfortunately, hard disk drives are generally quite susceptible to mechanical shock events, for example, during the time that the head or sensing assembly is actually accessing the rotating media. Consequences of a mechanical shock event occurring at precisely the most inopportune time include potential drive failure. For instance, a drive may fail when subjected to a 175 G event during an access. In this regard, Applicants are unaware of a miniaturized hard drive or overall device architecture incorporating effective features specifically intended to cope, for example, with the potentially harsh environment of a portable electronic device.

U.S. Pat. No. 6,061,751 (hereinafter the '751 patent), sharing the lead inventor of the present application, serves as one reference point with regard to several suggestions which may be utilized within a system incorporating a hard drive. The framework of the '751 patent, however, resides not in the area of drive miniaturization, ruggedization or portability, but primarily in reducing the cost of a hard disk drive as provided in an overall computer system. One approach taken by the patent encompasses moving all possible functionality out of the overall hard disk drive, including the controller, and onto the motherboard of the host device. For example, unused silicon "real estate" might be utilized for implementation of the controller. Moreover, such a controller may utilize memory that is already present on the host side. Thus, the drive cost is reduced to some extent. At the same time, it should be appreciated that the prior art functional control implemented as between the CPU and the controller is unchanged with respect to locating the controller on the motherboard. Specifically, the controller includes processing power which executes control code that is "native" to the peripheral device. As used herein, "native code" refers to the lowest level control code required to control a particular peripheral device. It is that code which is customarily executed by a device controller in a fashion that is isolated from the CPU resident within the host system.

FIG. 1 is a representation of FIG. 2 of the '751 patent, including alternative reference numbers assigned consistent with the present discussion. Accordingly, a prior art computer system 10 includes a host circuit board 12. A controller 14 is included as a single integrated circuit having further functions, as will be mentioned. A servo integrated circuit 16 is used to spin motors in any attached peripheral devices. Three peripheral devices are shown including a head disk assembly (HDA) 20, a CDROM/DVD 22 and a floppy drive 24. Alternatively, the latter may comprise a high capacity floppy drive, a miniature drive, or other suitable device.

One advantage, alluded to above, in the patent is the use of the HDA as an alternative to a complete hard disk drive (HDD) since costs are lessened by including components such as, for example, controller 14 within the host system. Components of the HDA (described above, but not illustrated) include a data media, a sensor/head mechanism to read and/or write data to and from the media, and motors to spin the media and position the sensor/head mechanism. A preamplifier is included to amplify the data read from or to be written to the media. The preamplifier may be installed on a flex circuit (see item 17 in FIG. 1A of the '751 patent) that electrically connects the HDA to the PCBA. It is appropriate to note, at this juncture, that the '751 patent also describes the location of a read/write channel, electrically in communication with the preamplifier, as potentially being arranged in the host system, distributed between the host system and the peripheral device or being within the peripheral device. The conventional location of the read/write channel in prior art HDD's is on the PCBA in close physical proximity to the electrical connection point of the HDA, for reasons described below.

Continuing with a description of FIG. 1, each peripheral device may also have an associated personality ROM 26. The specific location of the personality ROM is shown for an individual component in FIG. 3 (item 64) of the '751 patent. It is noted that the personality ROM is isolated from the rest of the individual component and is accessed via the PCI arrangement. Integrated circuit 14, in FIG. 1, further includes peripheral component interconnect (PCI) bus functionality such that the integrated circuit is interfaced to a PCI bus 28. It is noted that PCI bus 28 comprises one example of a number of possible bus mastering buses. A CPU 30 and chipset 32 are provided with the chipset connected to PCI bus 28. CPU 30 is, in turn, interfaced with chipset 32. A RAM section 34 is also interfaced to chipset 32. It is important to note that CPU 30 is indirectly connected to the peripheral components. Specifically, PCI bus 28 is interposed between the peripheral components, including HDA 26, and the CPU. While this arrangement may be advantageous with regard to cost reduction, certain disadvantages that accompany this configuration will be considered at appropriate points below. For the moment, it is noted that system control is accomplished by the CPU issuing commands that are placed on PCI bus 28 in accordance with mandated PCI protocol. It is submitted that certain penalties are associated with this style of command configuration. For example, commands issued through levels or layers of protocol higher than the native code are particularly inflexible.

The present invention provides a highly advantageous digital device configuration and method that are submitted to resolve the foregoing problems and concerns while providing still further advantages, as described hereinafter.

SUMMARY OF THE INVENTION

As will be described in more detail hereinafter, there is disclosed herein a Storage Element as well as associated devices and method. In one aspect of the invention, a device is configured for access by a user and includes an assembly having an electromechanical digital data storage arrangement configured for operation responsive to a native control code. The device further includes a processing arrangement which executes a control program for controlling the overall device and which executes at least a portion of the native control code, as part of the control program, for use in directly interfacing with the storage arrangement.

In another aspect of the present invention, an assembly includes a digital data storage arrangement made up of a rotatable read/write media, a head arrangement configured for reading and writing the rotatable media and a programmable channel at least for forming an interface between the rotatable media and the head arrangement. Additionally, a programming arrangement, produced separate from the digital storage arrangement, is electrically connectable with the digital storage arrangement at least sufficient to program the channel in a particular way that serves to customize the interface formed by the channel between the rotatable media and the head arrangement such that the digital storage arrangement is later to be used, without the programming arrangement, in an end installation including the customized channel.

In yet another aspect of the present invention, a system is described for providing a digital storage arrangement for end use in an end device. The system includes a rotatable read/write media forming a first part of the digital storage arrangement and a head arrangement forming a second part of the digital storage arrangement and configured for reading and writing the rotatable media. A programmable channel forms a third part of the digital storage arrangement and is configured at least for forming an interface between the rotatable media and the head arrangement. A programming arrangement, produced separate from the digital storage arrangement, is configured for electrical connection with the digital storage arrangement at least sufficient to program the channel in a particular way that serves to customize the interface formed by the channel between the rotatable media and the head arrangement such that the digital storage arrangement is later used in the end device including the customized channel.

In still another aspect of the present invention, in a device having a user access arrangement for receiving a user interaction and including a processing arrangement, the improvement includes a command execution arrangement for interpreting the user interaction in a way that defines a command to be executed by the processing arrangement and for initiating the execution of the command prior to termination of the user interaction. In one feature, a digital data storage arrangement is further included for storing digital information under control of the processing arrangement wherein the command defines a data access that uses the digital storage arrangement and the processing arrangement is programmed to initiate execution of the data access responsive to partial entry of the command during the user interaction. In another feature, the digital storage arrangement utilizes a rotatable media and an electronic memory arrangement is provided wherein the processing arrangement is programmed to execute the data access by reading certain information from the digital storage arrangement, after spinning up the rotatable media on which the certain information is stored, and for transferring that certain information to an electronic memory arrangement such that the certain information is available without the need to access the digital data storage arrangement.

In a further aspect of the present invention, within a device including an electromechanical digital storage arrangement and configured for receiving a plurality of external interactions, at least some of which require one or more data transfers using the storage arrangement, and at least some, but not all of which are user interactions, an assembly includes: a first arrangement for receiving a first one of the interactions requiring a first data transfer by the storage arrangement, a second arrangement for determining that the first interaction is a non-user interaction, and a third arrangement for delaying execution of the first data transfer, associated with the first non-user interaction, at least until a next user interaction.

In a continuing aspect of the present invention, within a device including an electronic memory arrangement having a capacity wherein the device is configured for responding to a plurality of external interactions including user interactions, at least a specific one of which interactions requires a specific data transfer to the electronic memory arrangement such that the specific data transfer is of a size that exceeds the capacity of the electronic memory arrangement, an assembly includes a first arrangement for loading the electronic memory arrangement with an initial portion of the specific data transfer to fill the electronic memory arrangement to its capacity such that the initial portion of data is available for use in a predetermined way. A second arrangement monitors the use, in the predetermined way, of any data stored in the electronic memory arrangement and a third arrangement is provided for loading an additional portion of the specific data transfer into the electronic memory arrangement to replace that part of the initial portion of the specific data transfer which has been used in the predetermined way such that an unused part of the initial portion of the specific data transfer and the additional portion of the specific data transfer are concurrently stored in the electronic memory arrangement. In one feature, the assembly includes an electromechanical digital storage arrangement such that the specific data transfer is stored by the electromechanical digital storage arrangement for transfer to the electronic storage arrangement in the first and additional portions.

In an ongoing aspect of the present invention, within a portable electronic device configured for receiving a user interaction and for operating in an overall environment which may subject the portable electronic device to mechanical shock, the device including an electromechanical Storage Element which is susceptible to such mechanical shock when reading and/or writing data and which is otherwise substantially less susceptible to mechanical shock, the electromechanical Storage Element is protected from shock at least to a limited extent by providing an electronic memory arrangement in the portable device. The user interaction is monitored to define a particular use of a selection of data stored on the electromechanical Storage Element. The selection of data is copied from the electromechanical Storage Element to the electronic memory arrangement. After using the electromechanical Storage Element in the copying step, availability of the selection of data for the particular use is indicated such that the user is able to initiate the particular use of the selection of data, through accessing the electronic memory arrangement, only after the electromechanical Storage Element is not in use and is substantially less susceptible to mechanical shock.

In another aspect of the present invention, in a device configured for access by a user and including a processing arrangement which executes a control program for controlling the overall device, an assembly includes an electromechanical digital data storage arrangement responsive to a native control code and a peripheral control arrangement configured such that the processing arrangement executes at least a portion of the native control code of the storage arrangement as part of the control program. The peripheral control arrangement includes an interface configured for implementing the native code between the processing arrangement and the electromechanical digital storage arrangement.

In still another aspect of the present invention, a digital data storage arrangement includes a rotatable media as well as a head arrangement configured for accessing the rotatable media by first initiating a control sequence intended to move the head arrangement from an unparked position to a parked position. Thereafter, a predetermined status is detected, related to head arrangement position which confirms that the head arrangement is in the parked position. An indication is then produced based on the predetermined status. In one feature, the indication is stored at a predetermined register location. In another feature, the storage arrangement is configured with a ramp for receiving the head arrangement in its parked position such that, when so received, the ramp and the head arrangement cooperate in a way which produces the indication thereby confirming that the head is in the parked position.

In another aspect of the present invention, in a digital data storage arrangement including a rotatable media as well as a head arrangement configured for accessing the rotatable media and for moving to a parked position, an apparatus includes a first arrangement for initiating a control sequence intended to move the head arrangement to the parked position after having accessed the rotatable media, a second arrangement for thereafter detecting a predetermined status related to head arrangement position by testing the head arrangement for reading from the rotatable media such that an inability of the head arrangement to read indicates that the head arrangement is at least away from the rotatable media, and a third arrangement for producing an indication based on the predetermined status.

In yet another aspect of the present invention, in a device including a processing arrangement for controlling operation of the device and including an electromechanical digital storage arrangement is described. A status of a particular attribute is established related to operation of the electromechanical digital storage arrangement. Using the processing arrangement, the status of the particular attribute is monitored for use in a further control operation.

In a continuing aspect of the present invention, in an electromechanical storage device including a rotatable magnetic media and a head arrangement configured for movement to access the rotatable media and for moving to a parked position, an assembly includes a first arrangement for producing a position signal which confirms that the head arrangement is in the parked position and an electrical interconnection arrangement in electrical communication with the head arrangement for use in controlling the head arrangement and which electrical interconnection arrangement is configured for receiving the position signal from the first arrangement for a control use.

In a further aspect of the present invention, in an electromechanical storage device including a housing supporting a spin motor for rotating a magnetic media disk and supporting an actuator arrangement for accessing the magnetic media disk using at least one head positioned on a distal end of the actuator arrangement, an assembly includes an electrical interconnection arrangement in electrical communication with said actuator arrangement and configured for forming an external interface to the storage device. The assembly is further configured such that at least a portion of the electrical interconnection arrangement is supported by the housing and includes a parking arrangement supported by the housing supported portion of the electrical interconnection arrangement for receiving the distal end of the actuator arm in a parked position.

In another aspect of the present invention, as applied to an electromechanical storage device including a rotatable magnetic media and a head arrangement configured for movement to access the rotatable media and for moving to a parked position responsive to at least one parameter in a parking sequence, an arrangement is provided as part of the electromechanical storage device, for producing a position signal which confirms the parked position of the head arrangement when so positioned. A calibration procedure is performed using the position signal to establish an operational value of the parameter for later use in parking the head arrangement.

In still another aspect of the present invention, as applied to a plurality of electromechanical storage devices each of which includes a rotatable magnetic media and a head arrangement configured for movement to access the rotatable media and for moving to a parked position responsive to a parking sequence, an arrangement is provided, as part of each electromechanical storage device, for producing a position signal which confirms the parked position of the head arrangement when so positioned. A calibration procedure is performed on each electromechanical storage device, in which the parking sequence is applied to each electromechanical storage device with the head arrangement initially in a data access position intended to move the head arrangement to the parked position. The parking sequence being repeatedly performed in a way which establishes a failure configuration of the parking sequence for each electromechanical storage device in which failure configuration the head arrangement at least once fails to achieve the parked position. A set of failure configurations, including at least one failure configuration for each electromechanical storage device, is tracked across the plurality of electromechanical storage devices.

BRIEF DESCRIPTION OF THE DRAWINGS

The present invention may be understood by reference to the following detailed description taken in conjunction with the drawings briefly described below.

FIGS. 4a-4c are diagrammatic timelines illustrating various approaches for performing data transfers in accordance with the present invention.

FIG. 4d is a diagram illustrating the status of data stored in an electronic memory arrangement of the device of the present invention at a particular point in time.

DETAILED DESCRIPTION OF THE INVENTION

Figure 2:
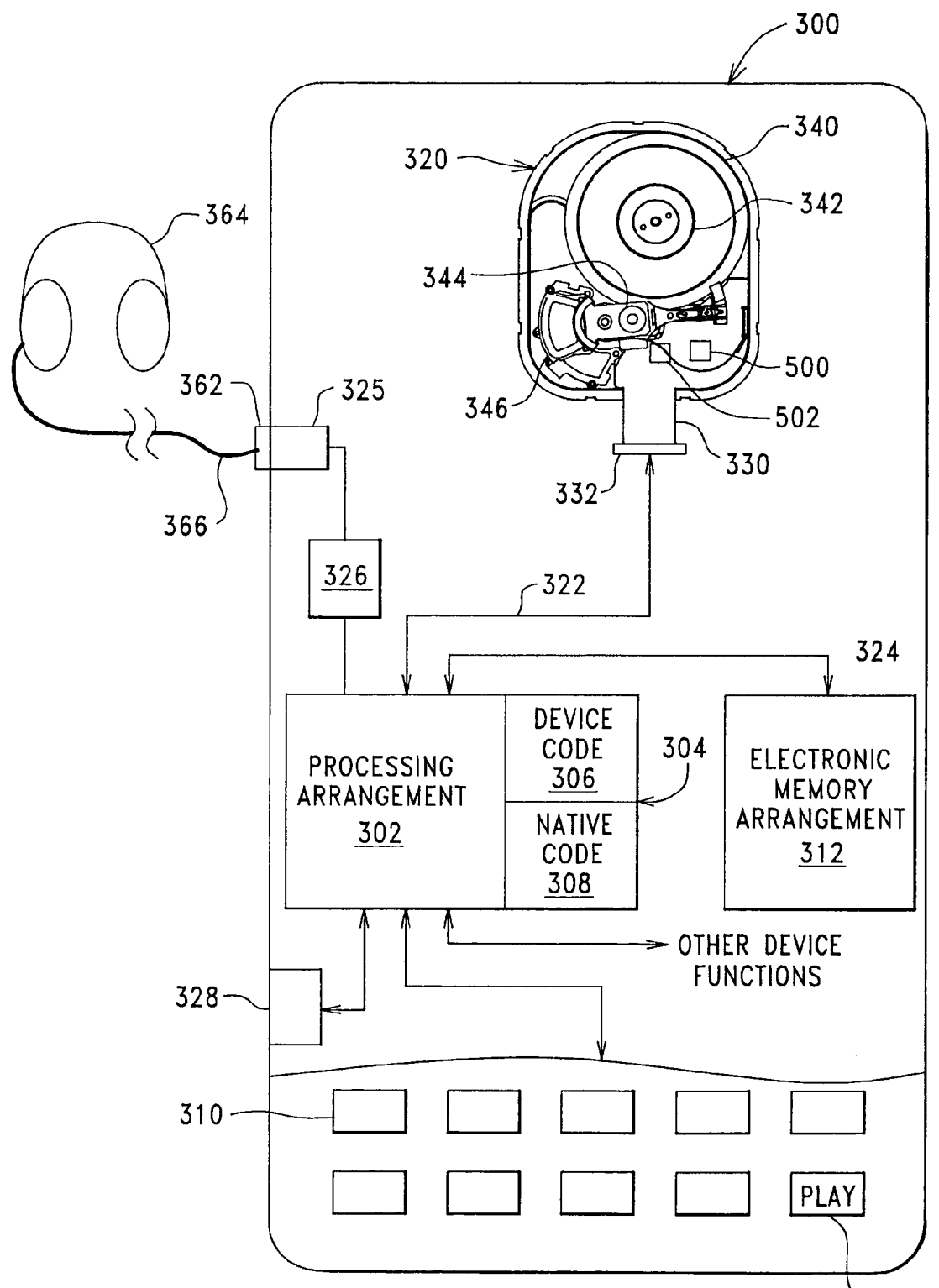
FIG. 2 is a diagrammatic block diagram illustrating one embodiment of a device implemented including a Storage Element of the present invention.

Returning now to the drawings, wherein like components are indicated by like reference numbers throughout the various figures, attention is immediately directed to FIG. 2, which illustrates an electronic device, generally indicated by the reference number 300, manufactured in accordance with the present invention. It is to be understood that device 300 is intended to be representative of any number of digitally implemented device types including, but not limited to wireless telephones, Internet appliances, personal digital assistants, music players, multi-function pagers, multimedia devices or any other device adaptable to use permanently installed digital storage of a size that is typically provided using electromechanical, rather than electronic storage. Moreover, the present invention facilitates the inclusion of additional functionality in devices traditionally having more limited, dedicated functionality. For example, a wireless phone may be provided including such features as a digital camera and/or a digital music player. Specific teachings with regard to integration of such functionality in particular device types will be provided at appropriate points below. The present invention is particularly suited for use in devices which may, at times, be subjected to use in a "hostile" environment in which the device experiences large mechanical shock forces. Portable devices are commonly exposed to such an environment. The present invention, however, is in no way limited to use in portable devices, but finds application in essentially any form of device that is likely to be subjected, at least briefly, to mechanical shock.

Continuing with a description of FIG. 2, device 300 includes a processing arrangement 302 configured for operating the overall device. Processing arrangement 302 includes at least one processor or central processing unit (CPU, not shown). Such a CPU may be designed to cooperate with a chipset (not shown) forming part of the processing arrangement. At the same time, additional, slave CPU's or chips (not shown) may operate at the behest of a master CPU, all of which are considered to form the processing arrangement. It should be appreciated that all of these configurations are considered as being within the scope of the present invention so long as certain teachings are practiced, as will be described.

A memory section 304 is associated with processing section 302 which may be, for example, a suitable form of ROM. Alternatively, the memory section can be made up of a suitable combination of ROM and RAM wherein a volatile RAM portion of the memory section is loaded for device operation during an initial boot-up. Memory section 304 itself includes device code 306 and native code 308. The latter will be described in detail below. Device code 306 enables functionality dedicated to operational and housekeeping tasks common to any particular type of device that is implemented. Moreover, it should be appreciated that the minimum amount of computational power that is commonly needed to operate a device, having somewhat limited dedicated functionality, is correspondingly quite limited with respect to the capabilities of the processors that are commonly employed in such state-of-the-art devices. As one example, processors in wireless telephones may typically be idle for a majority of the time. The present invention may rely on under-utilized capabilities of the processing arrangement in a highly advantageous way, as will be described hereinafter.

With continuing reference to FIG. 2, device 300 further comprises a user interface arrangement 310, for example, in the form of a keypad (only partially illustrated). Other items include an electronic memory arrangement 312 and a Storage Element 320, all of which are connected to processing arrangement 302. Buses/interfaces 322 and 324 connect the processing arrangement to the Storage Element and electronic memory arrangement, respectively. Electronic memory arrangement 312 may comprise volatile memory such as RAM having a predetermined size for use in performing particular operations under control of processing arrangement 302. As one example, the electronic memory arrangement may be loaded, in a manner yet to be described, with digital music that is later read by the processing arrangement, processed and, thereafter, provided to an audio output jack 325 via a suitable audio section 326. It is noted that, while certain features are described herein with regard to processing and handling digital audio, these descriptions are intended for illustrative purposes only and that the underlying concepts of the present invention enjoy a broad range of applicability. A digital interface 328 is provided having an external connection such that device 300 may be connected to an external computer. Suitable interface configurations include, for example, a Universal Serial Bus (USB) interface and IEEE 1394. With appropriate software installed on the external computer, a user may perform maintenance operations with regard to the content available on Storage Element 320. For example, a user may create playlists which are loaded onto the Storage Element. It should be appreciated that any form of digital information may be transferred to or from the Storage Element in this manner.

Storage Element 320 comprises electromechanical storage interfaced to device 300 by a flexible circuit 330 to be described in further detail along with descriptions of other components which make up the Storage Element. For the moment, it is sufficient to note that a connector 332 is provided which accepts a free end of flexible circuit 330 for purposes of interfacing Storage Element 320 to processing arrangement 302 within device 300 via bus 322.

Native code 308, used by processing arrangement 302, is directed to the sole purpose of operating Storage Element 320. The term native code, as mentioned above, encompasses code that is used in the direct control of a device that is peripheral to the processing arrangement. Native code is typically executed by a prior art controller chip and represents the lowest and most direct level of control of the peripheral device. In accordance with the present invention, processing arrangement 302 controls Storage Element 320 using its native code with no intervening protocol layers; comprising instructions that are directly received and acted on by components (to be described) in the Storage Element. No translation of these native code instructions is performed. In essence, native code is the inherent, executable language of the Storage Element. Prior art controllers serve to receive higher level protocol commands and interpret these into native code. In view of the foregoing discussions, direct control of the Storage Element exemplifies an advantageous application of potentially unused, but available processing power of processing arrangement 302. In the event that otherwise unused capability is used, device 300 generally exhibits no user-perceptible performance degradation, as compared to the same device operating conventionally; that is, compared to a device in which a dedicated controller executes native code. Moreover, processing power dedicated to the operation of the Storage Element may deliberately be limited to unused capabilities of a host processor (CPU) already present in the architecture of a particular device. Further, a "transitional" configuration may be provided as an interim solution which includes a transitional IC assisting the host processor in the execution of the native code of the Storage Element. The transitional implementation is advantageous in requiring minimal hardware changes in a preexisting host processor. Cost associated with the modification in the host processor may be limited so as to be essentially insignificant. That is, the modified processor may be provided for any application previously employing the unmodified processor as well as for new applications including Storage Element control functionality.

The transitional IC may be integrated in the chipset of the host IC using, for example, an interface made up of a clock line, one or more control lines and one or more data lines such as NRZ lines. The width of this interface may be limited to further reduce impact on the host processor in terms of pin count. The control line or lines, separate from the data line or lines, is considered to be advantageous in providing direct and immediate control over the Storage Element. In the instance of an interface requiring sharing of control, data and disk-related data (i.e., servo or "user" data stored by the Storage Element), control delays may be encountered as a result of waiting while disk-related data is being transferred. The present invention contemplates a need for immediate control, for example, when a sufficiently high probability of mechanical shock is predicted. Over time, functionality present in a transitional IC may migrate into the host processor. It should be appreciated that the host IC and the transitional IC may utilize vendor unique commands with regard to implementation of specialized features of the present invention within a prior art interface arrangement so long as such commands are compatible with the overall interface protocol that is used. Where the transitional IC is configured to respond to one or more vendor unique commands, the host side requires knowledge of the commands and appropriate programming on the host side to implement the vendor unique commands. For example, a Compact Flash Interface may be implemented between the transitional IC and the host IC utilizing one or more vendor unique commands. The foregoing feature will be discussed further at an appropriate point below.

Figure 3:
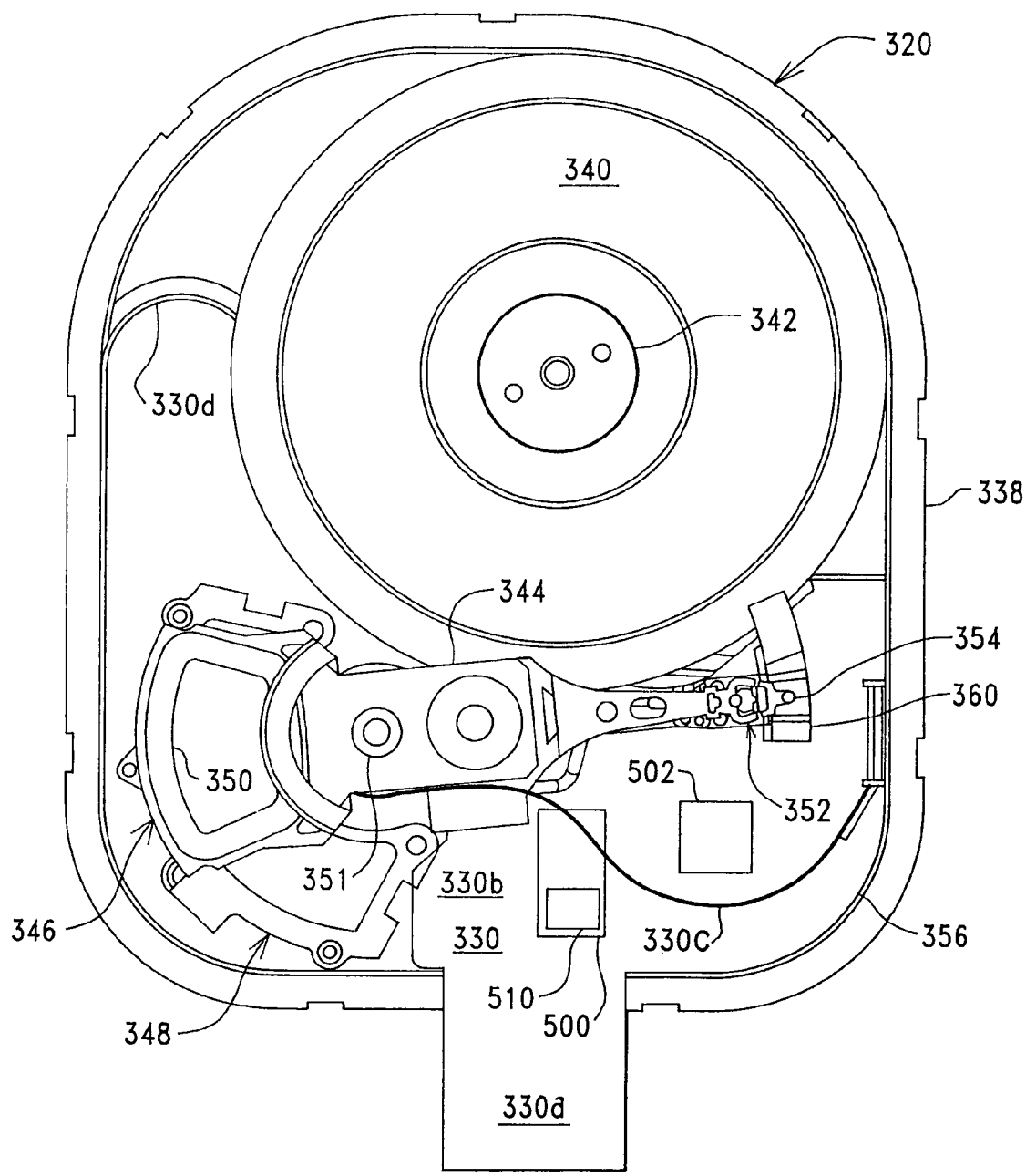
FIG. 3 is a diagrammatic plan view illustrating one possible physical embodiment of the Storage Element of the present invention.

Referring to FIG. 3 in conjunction with FIG. 2, a further advantage of the present invention resides in the "visibility" of the Storage Element to the processing arrangement. Since virtually every aspect of the operation of the Storage Element is controlled by processing arrangement 302 via native code 308, certainty as to the exact operational status of the Storage Element is achieved. In this regard, Storage Element 320 includes a housing 338. A rotatable magnetic media 340 is rotated by a spin motor 342 which is, in turn, supported by housing 338. A sensor arrangement 344 is positioned by a voice coil motor (VCM) 346 (only a portion of which is shown). The term sensor arrangement is interchangeable with the terms head arrangement and actuator arm. As is best seen in FIG. 3, illustrated portions of the VCM include a lower magnet assembly 348 and a voice coil 350 which is supported on the VCM end of actuator arm 346. The upper magnet assembly is not illustrated for purposes of clarity. The actuator arm is supported by an actuator pivot 351 which is, in turn, supported by housing 338 such that the distal end of the actuator arm opposing the VCM may engage magnetic media 340. The Storage Element of the present invention is not limited to the use of magnetic media. Any suitable media may be used such as, for example, optical media so long as the teachings herein are practiced. It should be appreciated that awareness of the status of the components of the Storage Element is important with regard to exposure to external mechanical shock and further in consideration of other attributes of the operation of the Storage Element such as, for example, power consumption wherein the status of spin motor 342 is crucial.

Still referring to FIG. 3, the distal end of the actuator arm opposing the VCM includes a transducer arrangement 352 and a lift tab 354. It should be appreciated that flexible circuit 330 includes various portions serving different components within the Storage Element. A free end 330a of the flexible circuit is configured for engaging connector 332 (see FIG. 2). A flex carrier platform 356 supports a main portion 330b of the flexible circuit. Flex carrier platform 356 is mounted (not shown) in a suitable way such as, for example, using standoffs which engage housing 338. In one highly advantageous feature, a ramp 360 is supported by flex circuit main portion 330b. Ramp 360 is engaged by tab 354 on the outermost end of the actuator arm when the actuator arm is moved into its illustrated parked configuration. Supporting the ramp in this manner, having the parked actuator arm proximate to the flexible circuit, facilitates application of the flexible circuit in confirming the parked position of the actuator arm, as will be further described. Other parts of the flexible circuit include an actuator arm connection 330c (also referred to as a dynamic loop of the flexible circuit), which is connected to main portion 330b, and a flex loop portion 330d which is connected between spindle motor 342 and main portion 330b.

Figure 1:
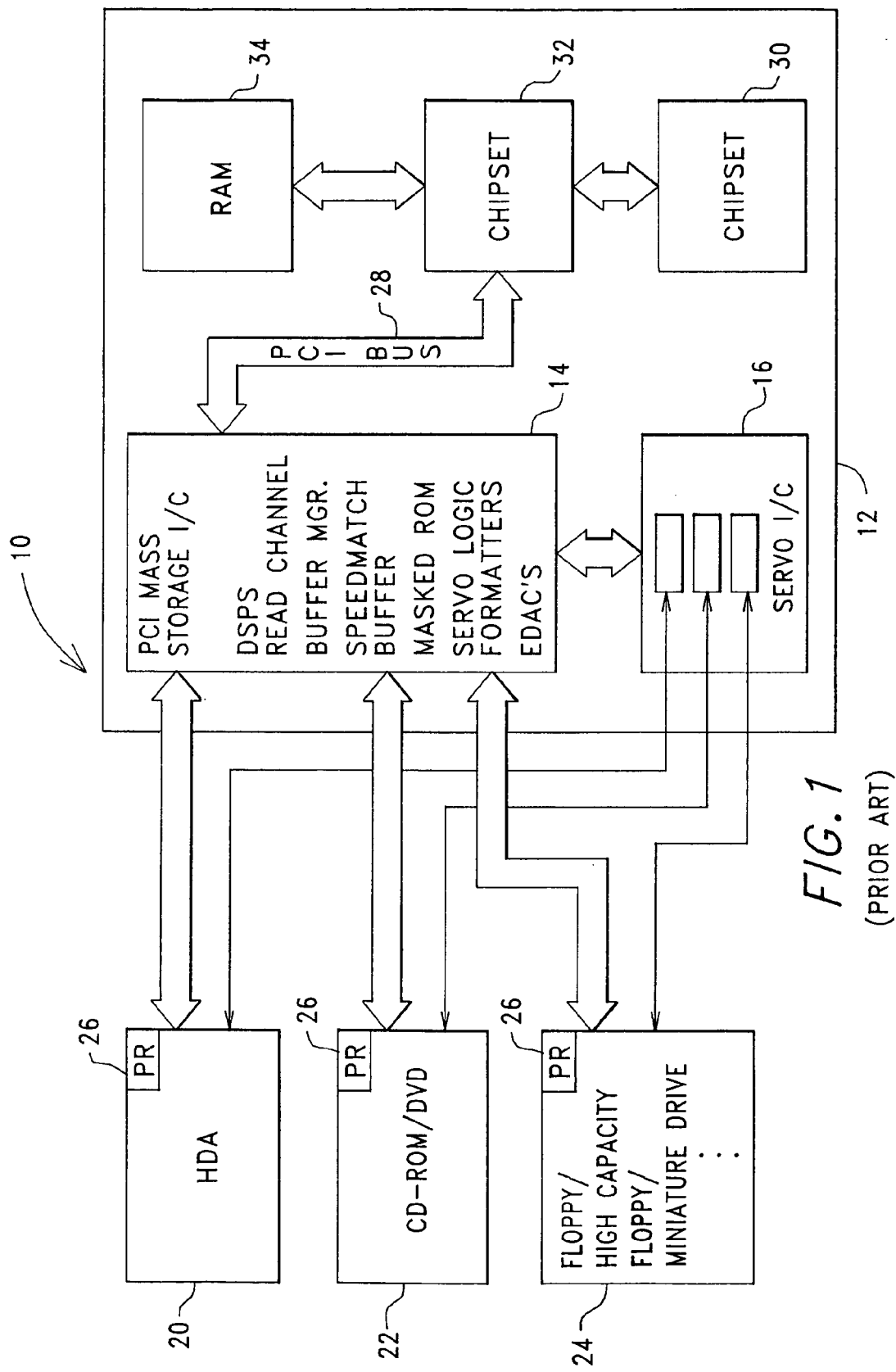
FIG. 1 is a block diagram taken directly from U.S. Pat. No. 6,061,751 shown here to serve as one focal point for discussion relative to prior art design considerations regarding hard disk drives.

Attention is now directed to FIG. 1 for the purpose of continuing the discussion of the visibility aspect of the present invention relative to the '751 patent. It is important to understand, with regard to prior art FIG. 1, that visibility of peripheral components to the processing arrangement, consisting of CPU 30 and chipset 32, is limited based on constraints imposed by PCI bus 28. An associated penalty, alluded to above, resides in a degree of uncertainty accompanying issuance of commands through the PCI bus to a controller which interprets the commands and, in turn, issues native code directly to the peripheral. Applicants are aware that, in some instances, discretion is present in the way that commands are implemented within the controller. As an example, in the context of the '751 patent, it is assumed that a read command is issued by CPU 30 for the purpose of transferring certain data from HDA 28 to RAM 34. Accordingly, the disk (not shown) of the HDA will spin-up prior to reading the data and a sensor (not shown) will then be used to read from the disk. As is well known to one having ordinary skill in the art, the HDA is especially susceptible to external mechanical shock during sensor access to the disk. At some point thereafter, the requested data will return via the PCI bus. From the perspective of the present invention, it is of interest that the status of the HDA disk motor and the sensor may be unknown. Specifically, the time at which the spin motor spins down and the sensor is parked are under control of the metrics of PCI mass storage IC 14, serving here as a controller. For example, the HDA spin motor may spin down if an additional command is not received within a predetermined period of time. Thus, spin down may occur long after completion of the requested data transfer. CPU 30 has no way of establishing the status of the HDA disk motor beyond issuing a "spin down" command, which may or may not be available, depending upon the protocol in use. Essentially, this is an open loop arrangement which is considered by Applicants as being unacceptable.

Attention is now directed to another prior art interface, CF+ which is mentioned above with regard to its use in the IBM Microdrive, in further examining discretion in command implementation with its accompanying problems. CF+ is an expanded version of CompactFlash that is enhanced to encompass various I/O devices including magnetic disk data storage. CF+ implements a CF-ATA command set which is taken from the ATA interface of IDE (Integrated Drive Electronics). One aspect of drive operation that is of particular interest with regard to the present invention resides in an awareness of the status of the head arrangement. Generally, as described, the head arrangement may be parked so as to provide its highest resistance to mechanical shock. It should be appreciated, however, that even though a head arrangement is not reading or writing data, it may be left in a floating state. One IDE command encompassed by CF+ is "Idle Immediate" (see page 74 of the CF+ specification). Typically, an idle state means that the spin motor is spinning, but there is no required status as to the head arrangement. That is, the head arrangement could be parked or floating. The actual status is left to the discretion of the implementer. The CF+ specification and IDE/ATA itself are therefore ambiguous with regard to head arrangement status in Idle. Other CompactFlash commands which exhibit similar ambiguity include Idle, Standby, Standby Immediate and Set Sleep Mode. While the designers of the interface perhaps considered this ambiguity as advantageous in allowing design flexibility, the present invention considers this ambiguity as unacceptable in view of the contemplated operating environment.

Unfortunately, the commands described immediately above are implemented in an open loop manner whereby no confirmation of actually accomplishing a physical act thought to be associated with the command is provided. The commands merely require clear BSY and generate an interrupt without defining an associated hardware status. The response may be generated as a mere response to receipt of the command by the receiving electronics. Thus, the capability to be certain as to the operational state or condition of a peripheral is limited at best and may be essentially nonexistent.

The present invention, in contrast, resolves this ambiguity through operating using the processing arrangement of the overall device in direct native code communication with the Storage Element while, at the same time, serving the entire device. That is, among many available control actions, the processing arrangement directly executes head parking using native code. In this way, there is no discretion as to implementation of an "intermediate" command which requires translation by a controller to, in turn, operate the peripheral device. Further, as will be seen, highly advantageous provisions are available for confirming the positional status of the head arrangement as well as other operational aspects of the Storage Element of the present invention. Again, such monitoring provisions, in being implemented with direct control by the processing arrangement, do not exhibit the command ambiguity seen, for example, in IDE and PCI. Moreover, the present invention incorporates highly advantageous status monitoring capabilities which are implemented via native code control and which are submitted to provide sweeping advantages when operating in a potentially hostile environment, as will be described in detail at an appropriate point hereinafter.

Any degree of discretion permitted in command execution is considered as problematic, particularly with respect to operation where potential exposure to mechanical shock is a reality. The processing arrangement and Storage Element of the present invention cooperate in a heretofore unseen way wherein the processing arrangement directly controls the Storage Element in a series of control events forming a data interchange sequence. The latter is typically initiated when no more than an initial portion of the user interaction defines no more than an initial portion of the data interchange sequence. Entry of a command during a user interaction is interpreted "on-the-fly" by processing arrangement 302 in a way that serves to define control events that are related to the native code of the device that is being controlled. Additional control events are then executable immediately upon interpretation, with continuing command entry by the user. Thus, the present invention copes with potential exposure to mechanical shock, in the first instance, through an intimate awareness of the operational status of a shock-sensitive peripheral. Still further features cooperate with this initial feature, as will be seen.

As described above, even prior art hard drives resist mechanical shock at relatively high levels when the actuator is parked and the spin motor is not spinning. Storage Element 320 is similar in this regard, including still further features which enhance its resistance to mechanical shock beyond the capabilities of prior art drives. Various ones of these features will be taken up at appropriate points in the discussion below. Electronic memory, on the other hand, is immune to mechanical shock for practical purposes. In this context, the present invention recognizes that placing Storage Element 320 into its most mechanical shock-resistant state, which may be referred to as its "safe state", is highly advantageous when exposure to shock events is more likely. Of course, electronic memory arrangement 312 remains usable irrespective of the potential mechanical shock exposure environment.

Under the assumption that device 300 comprises a cellular telephone incorporating a music player, it should be appreciated that such portable device genres may be subjected to significant levels of mechanical shock, for example, in being dropped or hit. The present invention recognizes that a device such as a cellular telephone is used in a general way which characteristically includes periods of time during which the phone/player combo is not likely to receive a significant mechanical shock. In particular, during actual access by the user of the device, for example, participating in a call, the device experiences a stable environmental condition. At other times, when the phone is not in use, the environment, relative to mechanical shock, is not so predictable. Such times include storage of the phone, for example, on a belt clip or in a purse. Even more precarious times include those times during which the user transitions the device from actual use to storage and vice versa. It is submitted that the transition time is the most hazardous since the user may drop the device, thereby subjecting it to high mechanical shock. Therefore, device 300 is configured so as to utilize Storage Element 320 primarily during user access while avoiding the use of the Storage Element during transition times which immediately precede and follow user access periods. Details with regard to implementation of this highly advantageous configuration are provided immediately hereinafter.

Referring to FIG. 2, in order to further mitigate the potential for subjecting device 300 to mechanical shock, the device includes a headphone receptacle disconnect feature. Accordingly, processing arrangement 302 unloads the Storage Element heads responsive to disconnect of a headphone plug 362 from device receptacle 325. Hence, if the device has been dropped, the heads are unloaded prior to contact of the device with the ground. In order to further enhance this feature and assuming that a headset 364 (or earpiece) is positioned on the user's head during playback, the length of a cable 366 leading to the headset and connected to the receptacle may be selected whereby disconnection will generally occur prior to the device contacting the ground. Still further benefit may be derived by providing elasticity in the headset cable. In an associated feature, head unloading time defines a minimum headphone disconnect drop height, above which there is sufficient time to accomplish the unloading operation, but below which there is insufficient time to perform head unloading. When the device is dropped below the minimum headphone disconnect height, shock susceptibility may be reduced or effectively eliminated due to protection imparted by a shock isolation mounting system provided for the Storage Element in conjunction with initial near proximity to the ground.

Figure 4A:
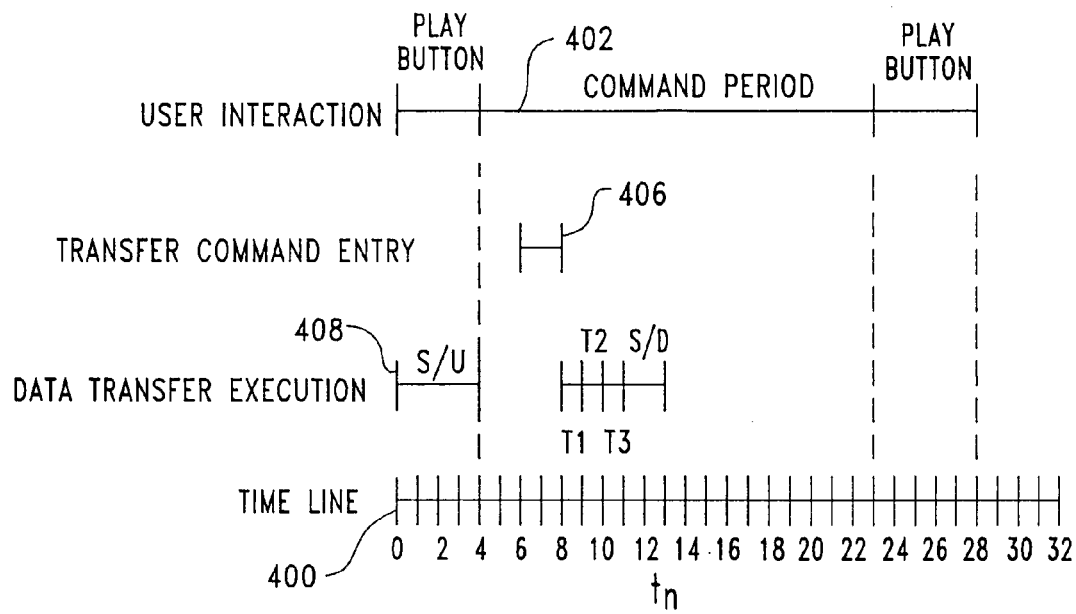

Having described certain physical attributes of device 300, attention is now directed to FIG. 4a in conjunction with FIG. 2. The former figure illustrates the operation of device 300, in accordance with the present invention, under a first operational scenario. A timeline is indicated by the reference number 400 with individual time periods from $t_0$ to $t_{32}$. A user interaction 402 takes place via user interface arrangement 310 and is made up of a sequence of individual commands. Initiation of the user interaction begins with the user actuating a song selection/play button 404 (FIG. 2). Thereafter, commands are used to select three songs to be played by the device. It is noted that selection of each individual song is not illustrated in the user interaction for purposes of simplicity. One example of a command sequence in selecting songs to play might be to initially depress play button 404. The initial actuation of the play button occurs over time periods $t_0$ to $t_4$. The user might then use numerical menu indications (not shown) within a song menu to enter specific songs from the list over the interval comprising time periods $t_4$ to $t_{23}$. Songs may be selected either as a group or individually. It is noted that a limited number of song titles are selected in the present example for clarity of illustration; however, any number of song titles may be selected, limited only by the constraints of the physical storage available in device 300.

For further purposes of the present example, all three selections are made in the form of a set at one point in time such that associated data transfers may be performed without intervening delays. Having selected these songs, the user concludes the command by again engaging play button 404 in a predetermined way, as will be described, over $t_{23}$ to $t_{28}$.

Initially, the digital data representative of each of the song selections is stored by Storage Element 320. Conversion of the digital information to an audio signal by processing arrangement 302, ultimately to be made available to a user at audio jack 325, first requires moving the data associated with the songs from Storage Element 320 to electronic memory arrangement 312. As mentioned above, playing the songs from electronic memory arrangement 320 is performed with relative immunity to mechanical shock, after moving the corresponding data from Storage Element 320 to the electronic memory arrangement. During the course of user interaction 402, processing arrangement 302 monitors the user interaction to interpret user input commands, as represented by a command entry line 406.

Processing arrangement 302 monitors user interaction 402 for the earliest possible indication that a data transfer involving Storage Element 320 is imminent. That point may be chosen, for example, as that time when the user views a song selection menu on a display screen (not shown) of the cell phone/music player device, when the user first depresses play button 404, when the user depresses a player selection button or device operation branches to player-oriented features during a menu-driven selection sequence being performed by the user. Rather than wait until user command period 402 is complete at $t_{28}$, processing arrangement 302 immediately readies Storage Element 320 for the access.

In the present example, the chosen point in time is selected as $t_0$, when play button 404 is first actuated. Accordingly, processing arrangement 302 responds by spinning up rotatable media 340. The spin-up event is shown in a data transfer execution line 408, indicated as S/U, beginning at time $t_0$ and continuing up to time $t_4$. It is noted that the spin-up process can comprise the most time consuming event in the overall operation of Storage Element 320. For this reason, anticipation of the pending data access, in the manner taught by the present invention, is considered to be highly advantageous. Further in this regard, spin-up time is not an arbitrary factor, but rather, can be controlled to provide optimum results. A number of factors should be weighed in this optimization including, for example, the fact that mandating a very fast spin-up in a portable device may result in shortened battery life. Still other factors affect the rate at which data transfers can be accomplished. Among these are the speed at which the magnetic media disk is rotated. It is noted that the typical point at which the prior art initiates command execution (i.e., spin-up) is typically at $t_{28}$. The present invention achieves a sweeping advantage, in terms of mechanical shock protection, by initiating command execution at a far earlier chosen point in time.

Having accomplished spin-up, data transfers can be accomplished in very rapid succession thereafter. In this regard, transfers illustrated in the present figures are shown as each taking one time period, while the spin-up time is shown as taking four time periods. It should be appreciated, however, that the time durations of the spin-up and data transfers may vary relative to one another according to particular implementations. The data transfers are indicated as T1-T3 wherein one of the transfers is associated with each song to be played. The present invention recognizes that the duration of data transfers to and from the electronic memory arrangement can be controlled in an affirmative manner that is not only operationally effective with regard to limiting exposure of Storage Element 320 to mechanical shock, but is also cost-effective.

Still referring to FIGS. 2 and 4a, data transfer T1 begins at time $t_8$, immediately upon completion of entry of transfer command 406. Transfers T2 and T3 begin at times $t_9$ and $t_{10}$, respectively. In essence, each transfer requires a data interchange sequence defining a series of control events that are discreetly executable by processing arrangement 302. As noted above, each transfer is completed in a single time period. Following completion of transfer T3 at time $t_{11}$, processing arrangement 302 "shuts down" the Storage Element spin motor and parks its head sensor arrangement over time periods $t_{11}$ and $t_{12}$, indicated as S/D, to place the Storage Element in the safe state. In this regard, it is noted that the shut-down process may be somewhat long compared to the data transfer times, again depending upon the particular implementation. The more important component of the process essentially consists of unloading sensor arrangement 344 to its mechanical shock-resistant parked position. It should be appreciated that this latter operation can be performed in a rapid manner. For example, prior art hard drives are capable of parking the actuator or sensor arrangement in time periods on the order of 200 milliseconds. With certain enhancements, the present invention contemplates parking of sensor arrangement 344 of Storage Element 320 in a time period of no more than approximately 100 milliseconds. In any case, time periods of these orders of magnitude are typically far shorter than responses seen as a result of human interaction. In the present example, the command period of user interaction 402 extends considerably beyond completion of transfer command 406 such that the Storage Element has long since been placed into its safe state pending a potential mechanical shock event during a subsequent transitional movement by the user. Alternative scenarios will be presented below.

Still considering FIG. 4a, it is important to understand that the capability of the present invention to provide for the best protection against mechanical shock for the Storage Element during the transitory period is derived from beginning the command execution sequence at the soonest possible moment. This precept allows for completion of associated data transfers at the soonest possible time, even prior to conclusion of the user interaction. The beginning of data transfer execution may be delayed somewhat, for example, by initiating the spin-up at the conclusion of the initial actuation of play button 404 at time $t_4$ or even until conclusion of transfer command entry at time $t_8$. In this regard, it is noted that nine time periods make up the actual spin-up, data transfer and spin down operations. Therefore, spin-up could be initiated as late as time $t_{19}$ in order to successfully complete all of the operations by time $t_{28}$. It should be mentioned that this capability is available, at least in part, as a result of the intimate control and awareness present between processing arrangement 302 and Storage Element 320 enabled by running native code in the processing arrangement. As will be described below, a number of features may be provided to ensure that data transfer operations are at least partially complete and return to the safe state is accomplished prior to a user transition of the device.

Figure 4B:
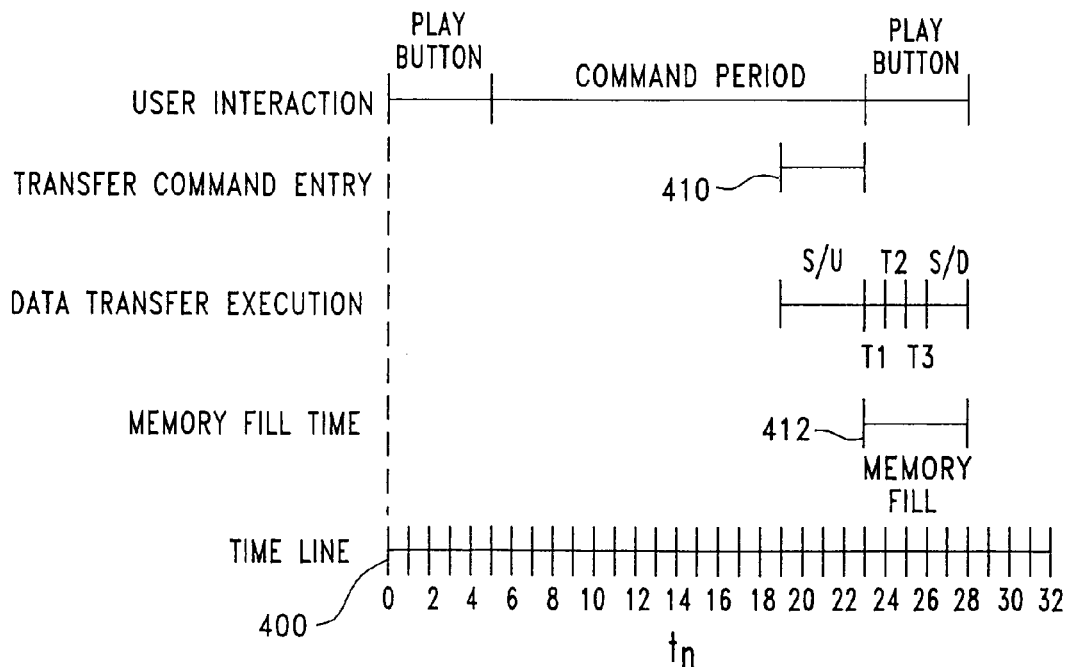

Referring now to FIGS. 2 and 4b, one highly advantageous feature of the present invention, relating to mechanical shock resistance of Storage Element 320, resides in control of the size of data transfers to and from the Storage Element. For descriptive purposes, FIG. 4b illustrates a transfer command entry 410 interpreted over time periods $t_{19}$ through $t_{23}$ to define T1-T3. It should be appreciated that these transfers utilize electronic memory arrangement 312. Spin-up occurs concurrent with transfer command entry. By sufficiently limiting the overall storage capacity of the electronic memory arrangement, the duration of time required by any data transfer is limited to the corresponding time that is required to fill electronic memory arrangement 312. In the example of FIG. 4b, it is assumed that the electronic memory arrangement can be filled (or completely written to Storage Element 320) and then spun down by processing arrangement 302 in no more than five time periods, providing for completion of data transfers T1-T3. Hereinafter, this specific length of time may be referred to as the "memory fill" time period indicated by the reference number 412. In this connection, the reader is reminded that the user of device 300 is required to actuate play button 404 so as to conclude the user interaction. In order to ensure that all data transfers involving Storage Element 320 are completed at or before the conclusion of the user interaction, the user is required to press play button 404 for a time period that is at least as long as the memory fill time or may require a confirmation action (such as, for example, subsequently depressing a button). This actuation of the play button may be referred to hereinafter as "play initiation" or "command initiation". Again, such time durations, as contemplated here, are extremely short in terms of human perception. As a practical example, the present invention contemplates a memory fill time of approximately 2-4 seconds using an electronic memory arrangement having a capacity of 32 MB. It should be mentioned that limiting the size of the electronic memory arrangement is attended by the further advantage of cost savings. As will be seen, the present invention uses the electronic memory arrangement in ways that might lead a user to believe that an electronic memory of a much greater size has been provided. Of course, larger size electronic memories may be employed while still practicing the teachings disclosed herein by appropriately setting a maximum size data transfer.

Other modifications are equally within the scope of the present invention. For example, the Storage Element spin-up time may be included as part of the memory fill time to define an "extended memory fill time". In this instance, the user is required to press play button 404 for the additional length of time encompassing the drive spin-up time. The Storage Element spin-up time may be on the order of, for example, less than 500 milliseconds. In the event that the user fails to depress the play button for a sufficient period of time, an audio and/or visual alert may be provided. Moreover, insufficient actuation of the play button may trigger an immediate shutdown of the Storage Element, ignoring any pending data transfers in order to avoid the mechanical shock threat which is present during user transitioning of the device, following the incomplete user interaction. In the presence of such constraints placed upon the user, it is considered that the user will quickly learn to use the device consistent with imposed requirements for best protecting Storage Element 320 from the risk presented by mechanical shock. Even with the foregoing operational constraints in place, it is considered that a user may operate and treat device 300 in essentially the same manner as a device conventionally configured without Storage Element 320. That is, any differences are intended to be essentially inconsequential from the viewpoint of the user. As an alternative, presentation of a play option may be precluded until such time that data transfers from the Storage Element to memory have been completed.

Turning now to FIGS. 2 and 4c, in one feature associated with the use of a limited size electronic memory arrangement, the present invention operates in an opportunistic manner when handling data transfers that are larger than the memory fill size. FIG. 4c illustrates a user interaction sequence 420 having a first User Access Event which itself defines six data transfers having a combined size that is twice the size of electronic memory arrangement 312. That is, the user interaction defines a total transfer size that exceeds the capacity of the electronic memory arrangement. The first user interaction begins at $t_0$ and continues until time $t_{11}$ upon release of play button 404 or other such identifiable event. The six transfer commands are entered during a transfer command entry period 422. In the present example, the first three transfers are selected as a group while the last three are individually selected. The user may have selected the song items to be played by viewing different song lists in some random order, thereby creating an extended command entry period having idle times between selections. Again, this command entry period has been shown in a way that accommodates illustrative limitations of the present forum which, when drawn in proportion, would appear much longer in duration compared, for example, to transfer times. Individual transfer commands are not shown in User Access Event 1 for purposes of simplicity.

Spin-up of rotatable media 340 of Storage Element 320 is initiated at time $t_0$ with actuation of play button 404 (indicated as P/B), prior to transfer selections made by the user. Transfer of the digital data corresponding to the first song selection ensues on a data transfer execution line 424 at a time during the transfer command entry when the user selects the song corresponding to T1. Thus, in the present example, command execution begins not only prior to the end of user interaction 400, but even before actual completion of command entry 422 by the user. Alternatively, spin-up of the Storage Element magnetic media may be delayed until time $t_2$, corresponding to the definition of transfer T1 being available, in view of the ongoing entry of the transfer command sequence during transfer command entry 422; however, entry into the safe state of the Storage Element is thereafter delayed by a portion of the spin-up time.

By initiating spin-up upon detection of actuation of the play button, each of the T1-T3 data transfers may be performed almost simultaneously with the associated command defined within User Access Event 1. As mentioned above, it is also considered to be advantageous to spin-up responsive to a menu selection sequence initiated by the user at a point which branches to player functionality. In any case, for play initiation, the user is required to depress play button 404 for the predetermined period of time from $t_6$ to $t_{11}$, corresponding to that time which is required to completely fill electronic memory arrangement 312 after the command entry selections. The actuation is indicated as play initiate (PI) in user interaction 420. It is observed that the transfers are complete and the Storage Element is placed into its safe state well before the earliest time ($t_{11}$) at which the user may release the play button for play initiation of all pending data transfers. In the event that the user fails to successfully play initiate the selections, the pending transfers may be canceled and the Storage Element immediately placed into its safe state. At the same time, an error signal may be provided to the user. The error signal serves at least two purposes. First, it informs the user that an error was made such that the user may modify future selection entry to avoid the inconvenience of canceled selection transfers. Second, the error signal is intended to introduce a delay prior to the user transitioning the device, for example, to a belt clip or purse. In this regard, it is considered that even the slightest delay on behalf of the user will provide for proper entry of the Storage Element into the safe state prior to transitioning of the device. As another alternative, the Storage Element may be placed in the safe state immediately upon indication by the user that no additional selections are to be made which would require an associated transfer. For example, upon being presented with a screen display asking, either alone or as one choice in an overall menu, "Make another selection? y=1, n=2. x?", an "n" or "no" choice may result in immediately placing the Storage Element into the safe state, irrespective the status of ongoing and/or pending transfers. In most cases, it is considered that a majority of the transfers requested by the user will opportunistically be completed while the user interaction is underway. Still further alternatives may be developed by one having ordinary skill in the art in view of this overall disclosure.

Having filled the electronic memory arrangement using T1-T3, the data stored therein may be used in any suitable way. For exemplary purposes, the present discussion assumes that the data is used to generate a music signal during an interval labeled as I1. The present example further assumes that the data is used to form the music signal at a rate that is one-sixth the rate at which the data may be transferred. Of course, such data is much more likely to be used at a far slower rate, in comparison with the data transfer times. For the purpose of playing music files with state-of-the-art compression, Applicants contemplate a play time of approximately 60 minutes where the electronic memory arrangement has a size of approximately 32 MB. Because the user-defined transfer is incomplete until such time that all six song selections have been made available for listening, processing arrangement 302 is advantageously configured for tracking use of the data that is stored by the electronic memory arrangement.

With regard to mechanical shock, it is desirable to perform the remaining data transfers, comprising T4-T6, so as to limit potential exposure of Storage Element 320. In accordance with the present invention, the remaining data transfers are performed at one or more opportune times. In the present example, one additional transfer of all three remaining song titles is capable of completely filling electronic memory arrangement 312. Such a transfer would include all of T4-T6. According to the teachings above, the most opportune time to perform data transfers is generally during a user access. Unfortunately, because the precise timing of subsequent user accesses is unknown, there is no certainty as to a user access taking place at the precise time when playback of the three initial transfers concludes. As will be seen, the present invention provides a highly advantageous feature to address this problem in an effective manner.

It should be remembered that user accesses are performed for various purposes. In the present example, accesses may be performed for the purpose of selecting songs to be played or to use other features of device 300, for example, in telecommunications modes which may include receiving and originating telephone calls and/or the implementation of other messaging services such as paging and sending and/or receiving e-mails. When device 300 is used for any of these other intended purposes, the associated user access, like the access for the purpose of entering song selections, is likewise less subject to the receipt of a mechanical shock. For this reason, device 300 is configured to opportunistically execute data transfers involving Storage Element 320 during user accesses whenever possible.

Referring to FIG. 4*d* in conjunction with FIGS. 2 and 4*c*, one important feature associated with this opportunistic configuration resides in replacing "used" data resident in electronic memory arrangement 312 during subsequent user accesses, irrespective of the specific purpose to which the subsequent user accesses might be directed. For purposes of illustrating this feature, user interaction 420 includes a series of interactions, labeled as User Access Events 2-4, subsequent to User Access Event 1. It is assumed, for illustrative purposes, that each of these subsequent events involves using device 300 in a telecommunications mode, for example, receiving or originating a telephone call, such that playback of audio data stored in the electronic memory arrangement 312 ceases for the duration of the call. At time $t_{17}$, User Access Event 2 is initiated. Playback of audio data stored by electronic memory arrangement 312 takes place during an interval I1 from the conclusion of playback initiation at $t_{11}$ to $t_{17}$. At the onset of User Access Event 2, six playback time periods have elapsed, corresponding to the playback of the song associated with the T1 transfer. It should be remembered that the duration of the subsequent user events has been illustrated as being extremely short in order to fit these events into FIG. 4*d*. In reality, it is likely that these user events would appear extremely long relative to events such as placing Storage Element 320 into its safe state. Nonetheless, the concepts of the present invention remain effective, even in the face of the extremely short user access intervals illustrated.

FIG. 4*d* illustrates the state of electronic memory arrangement 312 at $t_{17}$. One-third of the stored data has been used during I1; while the data transferred in T2 and T3 remains unused, filling the remaining two-thirds of the capacity of the electronic memory arrangement. When User Access Event 2 is initiated at $t_{17}$, processing arrangement 302 recognizes the opportunity to safely replace the used T1 data contained by the electronic memory arrangement. Accordingly, magnetic media 340 of the Storage Element is spun up at $t_{17}$ for the purpose of transferring T4 at time $t_{20}$. Immediately thereafter, the Storage Element is placed into its safe state. As illustrated in FIG. 4*c*, this process is repeated for transfers T5 and T6 at User Access Events 3 and 4, respectively. The data stored in the electronic memory arrangement 312 corresponding to the T2 transfer is replaced by the T5 transfer, while the data corresponding to the T3 transfer is replaced by the T6 transfer, respectively. Processing arrangement 302, operating as described, has orchestrated a highly advantageous cooperation taking place between the electronic memory arrangement and the Storage Element that is transparent to the user. In the instance of events which necessitate ceasing audio playback such as, for example, receipt or initiation of a call, it is generally considered to be desirable to require the user to re-initiate audio playback even though audio playback could resume automatically. Re-initiation serves the purpose of confirming that the user indeed wishes to continue listening to audio that is electronically saved. This subsequent event re-initiation has not been illustrated in FIG. 4*c* due to drawing space limitations. In one feature, the user may receive a prompt to view a menu with various selections as to the use of electronically saved data. As an example, the menu selections might include: 1) Resume audio playback; 2) Add more playback selections; 3) Edit playback selections; 4) Suspend playback until later; and 5) Erase current selections.

It should be appreciated that there may be times when no subsequent user access events occur to enable opportunistic performance of data transfers. The behavior of device 300 can be controlled, under such circumstances, so as to implement a desired level of mechanical shock protection for the Storage Element. In order to provide the highest possible level of protection, the device may signal to the user, via processing arrangement 302, that it has run out of data to play and, thereafter, stop playing. For example, an audio statement may voiceover the playback audio saying, for example, "Please refresh the song play list." Visual notifications may be provided as an alternative or accompanying the voiceover. Alternatively, the device may be configured to repeat playback of the data that is already present in the electronic memory arrangement. The user then has the option of initiating a user interaction in order to permit an opportunity to refresh data stored by the electronic memory arrangement.

The present invention provides a particular feature which is considered to be highly advantageous, for example, in the context of refreshing the electronic memory arrangement. Specifically, an arrangement and method are disclosed for monitoring the environment of the Storage Element. One aspect of environmental monitoring that is encompassed is measurement of mechanical shock at the location of the Storage Element. Thus, rather than attempting to control the environment by requiring a user interaction to refresh the electronic memory, the processing arrangement may observe the current shock environment and/or a record thereof in making an assessment as to whether the current environment is safe enough to proceed with a "refresh" transfer. These environmental monitoring features will be described in detail at appropriate points below.

Inputs or events, other than user accesses, may take place which ultimately require use of the Storage Element so as to create pending data transfers. In the absence of a user access coincident with the input, however, it is preferred to store data in the electronic memory arrangement. For example, an incoming email or voice message may be received. Under such circumstances, the present invention contemplates electronic storage, at least temporarily, within electronic memory arrangement 312. For example, an incoming email or voicemail message may always be given storage priority over digital music stored in the electronic memory arrangement. Initially, audio data that has already been played back may be replaced. When a user access is thereafter initiated, such as a telephone call, the electronically stored messages may opportunistically be moved from electronic storage to the Storage Element in a manner that is consistent with the foregoing descriptions.

Under the aforedescribed situation in which pending data transfers are defined as a result of the limited storage capacity of the electronic memory arrangement, another operational condition may arise wherein a subsequent event itself requires access to the Storage Element. In this instance, the associated transfers may be performed in a sequential or interleaved manner. The reader is again reminded that the combined size of all transfers is limited by the capacity of the electronic memory arrangement which, in turn, limits the potential time duration of a "memory fill" transfer. Additional priorities may be prescribed such that communications transfers (e.g., voice and email) have priority over music data transfers.

When an incoming message such as, for example, a voice mail or email is of a size that is larger than the electronic memory arrangement, storage of the message may begin in the electronic memory arrangement. In the absence of a user interaction, the user may be notified of the incoming message in a suitable manner so as to initiate a user interaction. If the user is unavailable, the highest level of protection for the Storage Element mandates postponing receipt of that particular message until a more opportune time.

In view of the foregoing, attention is now directed to the command design concept and command interpreter of the present invention. Having the highly advantageous recognition in hand that command entry and execution may occur concurrently, rather than sequentially, Applicants further recognize that cooperation between the processing arrangement, Storage Element and electronic memory arrangement can provide even more enhancement with regard to completion of data transfers in the most expedient manner possible, relative to a specific command. In particular, the present invention provides for "building" or designing commands in a way which is thought to implement the most rapid possible execution of associated data transfers. One example, seen frequently in the foregoing discussions, resides in when the command specifies spin-up of the rotatable media of the Storage Element. In one feature, spin-up of media 340 of Storage Element 320 takes place once the number of defined transfers have a combined capacity that approaches or exceeds the storage capacity of electronic memory arrangement 312. Thus, referring again to FIG. 4c, assuming that transfers T1-T3 equal the capacity of electronic memory arrangement 340 and further assuming that T1-T3 are all defined at time $t_4$ (during entry of transfer command 422), spin-up (not shown) takes place at $t_4$. In association with this feature, the command interpreter may on-the-fly examine the size of each transfer as it is defined to monitor the overall size of the combination of defined transfers. A determination may be made, for example, of an average size transfer. At a point during user selections when the combined total size of all transfers leaves less space available in the electronic memory arrangement than one average size transfer, spin-up may be initiated. In other words, spin-up occurs when the user is within one average size selection of memory fill.

The command interpreter of the present invention may also establish optimum spin-up time based on the rate of user activity during entry of transfer commands. For example, the command interpreter of the present invention may monitor the rate at which a user makes selections. In this way, an average selection rate can be established such that optimum spin-up time is determinable based, at least in part, on the average selection rate. The optimum spin-up time is determined, in essence, based on the user's history in making selections, it can be estimated at what time the user will have made a sufficient number of selections to fill or nearly fill the electronic memory. It should be appreciated that the objective of these various features is to spin the rotatable media for a minimal amount of time necessary. In other words, it is desirable to begin transfers as soon as possible during a command entry sequence, but to avoid idle times between defined transfers such that the Storage Element is generally experiencing data transfers when it is spinning whereby to save battery power as one advantage. The described features may be combined in any suitable manner in order to accomplish these objectives.

Command design is also important with regard to implementation of other features such as the play initiate feature, described above, which serves to ensure that the Storage Element is in its safe state prior to the conclusion of a user interaction. In this connection, it should be appreciated that commands issued through the present invention encompass the complexity of the native code of the device being controlled. It is submitted that the absence of intervening layers of protocol provides, to a large degree, the capability to design commands in accordance with the teachings herein. Other features, typical of control events, that are at the discretion of the command designer include but are not limited to head and spin motor status. As will be further described, the present invention contemplates environmental status as a factor in command execution.

Figure 5A:
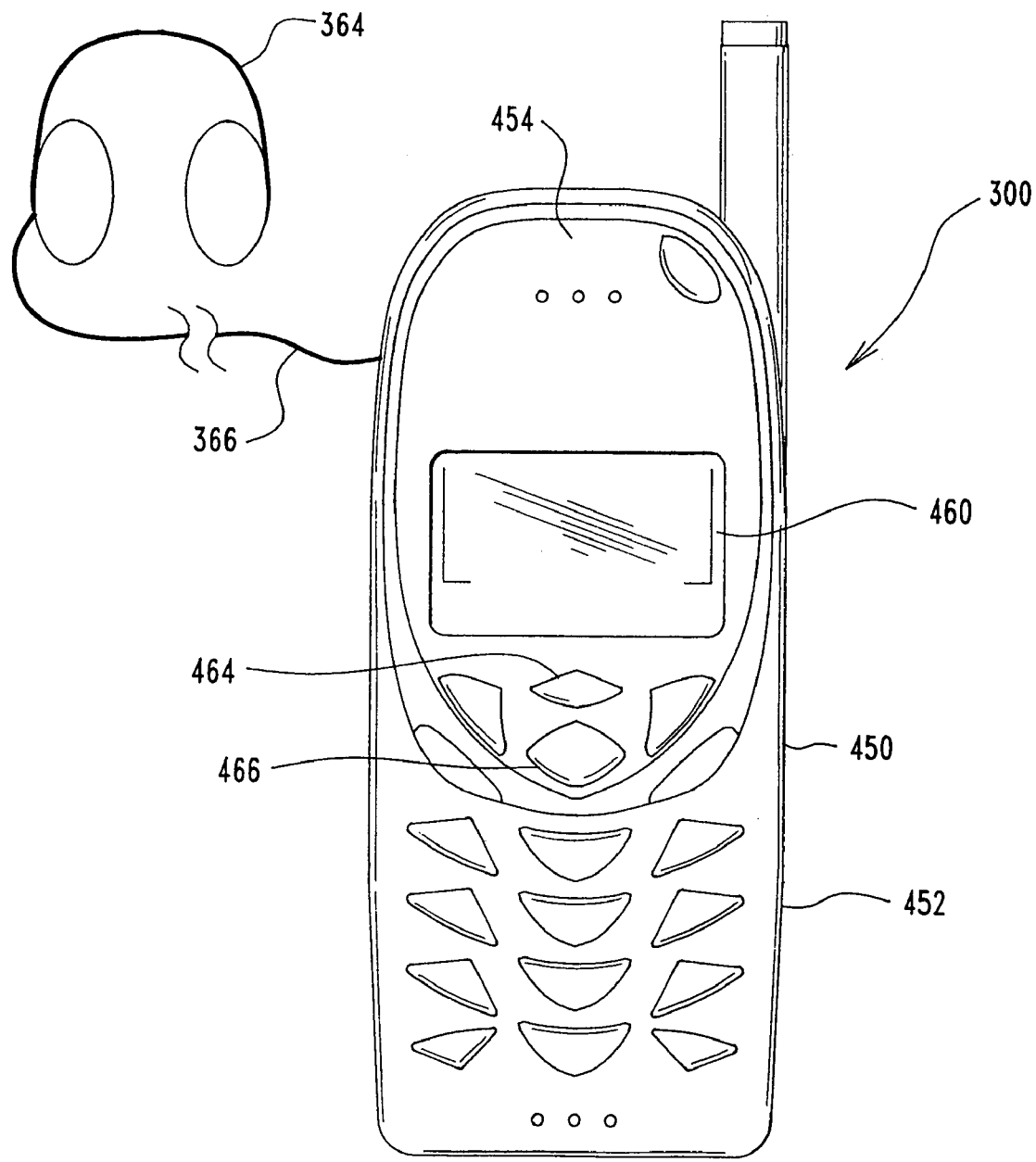
FIG. 5a is an illustration of one possible appearance of the device of FIG. 2 produced in accordance with the present invention including a display screen and connectable, for example, with a headset, as shown.

Attention is now directed to FIG. 5a which illustrates an external view of one potential implementation of device 300. Device 300 may selectively incorporate any of the features and concepts described herein with regard to those described in this overall disclosure. Accordingly, the device may comprise a hybrid combining the functionality of two or more separate prior art devices. Specifically, the combination of a wireless or cellular telephone and a digital music player is implemented in device 300. The latter includes a housing 450, a user accessible keypad 452, a speaker area 454 positionable proximate to a user's ear, a microphone having a sound pickup (neither of which is shown) at an appropriate location on housing 450 and a display screen 460. Storage Element 320 is mounted using mechanical shock isolation features within housing 450, but is not visible in the present illustration. Since the capability to play digital music is provided, device 300 further includes an audio output jack such as indicated by the reference number 325 in FIG. 2. The audio output jack is selectively connectable, for example, with audio headset 364 or any other earpiece arrangement suited for individual listening. Alternatively, the output may be provided to an audio or computer system. As described above, device 300 may incorporate a digital interface (see interface 328 in FIG. 2) at a suitable location on the housing. In this way, the device may interface with a user's computer at least for purposes of monitoring and controlling the digital music or other data saved on the Storage Element. The present invention further contemplates connection of device 300 to another portable device including, but not limited to another, identical portable device for purposes of data sharing.

Figure 5C:
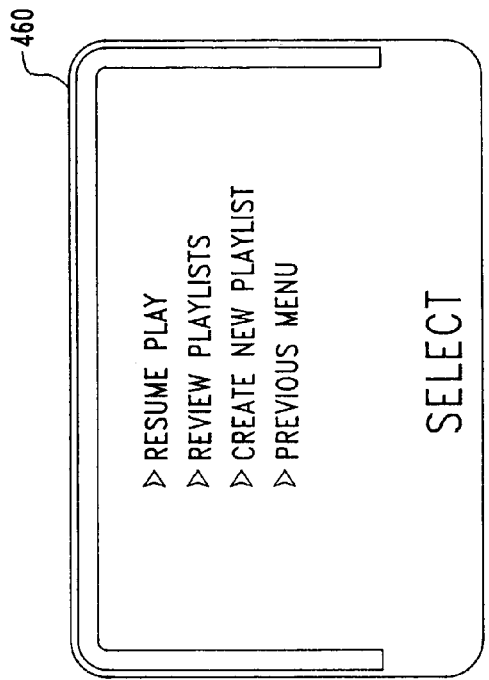
FIGS. 5b-5g are diagrammatic illustrations of the appearance of the display screen of the device of FIG. 5a, shown here to illustrate potential operational sequences occurring during interactions with a user of the device performed in accordance with the teachings of the present invention.
Figure 5E:
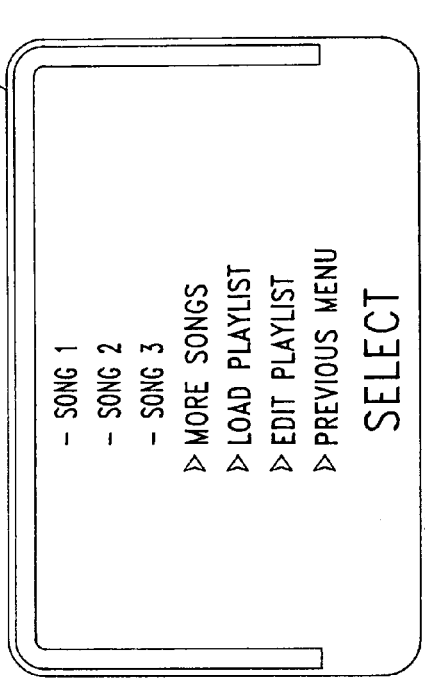
Figure 5B:
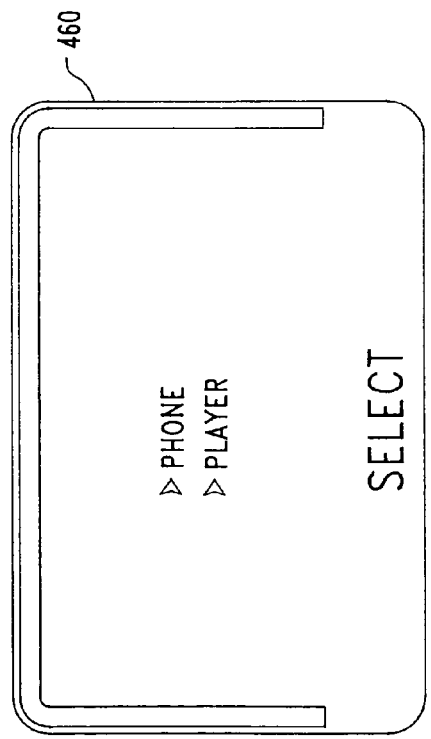

Turning now to FIG. 5*b* in conjunction with FIG. 5*a*, a series of screen shots will be described illustrating the operation of device 300 primarily with respect to its digital music mode and associated features. FIG. 5*b* illustrates screen 460 of device 300 wherein a selection menu is presented to the user. The user may select either "Phone" or "Player", for example, by using up and down arrow keys 464 and 466, respectively, on keypad 452. In the present example, it is assumed that the user selects the Player option.

After selection of the Player mode, FIG. 5*c* illustrates one possible presentation given on screen 460. Upon entering the player mode, it should be appreciated that the user may have previously been using the player only to be interrupted by a telephone call or perhaps may have stopped playback for some other reason at a point during a playlist. Accordingly, a menu is presented having four choices including "Resume Play", "Review Playlists", "Create New Playlist" and "Previous Menu". The "Resume Play" selection starts play of a previously selected playlist at the point where playback was last stopped or paused. Such a previously selected playlist will remain available in electronic memory arrangement 312 (see FIG. 2) until such time that the user chooses to replace it. The "Review Playlists" selection permits the user to select any previously created playlist available on the Storage Element. Playlists may be created using keypad 452 and display 460 or may be created using an external computer interfaced with device 300 via its USB interface port (FIG. 2) or other suitable interface arrangements. The former process is initiated with the selection of the "Create New Playlist" selection. Selection of "Previous Menu" returns the user to the display of FIG. 5*b*.

Figure 5D:
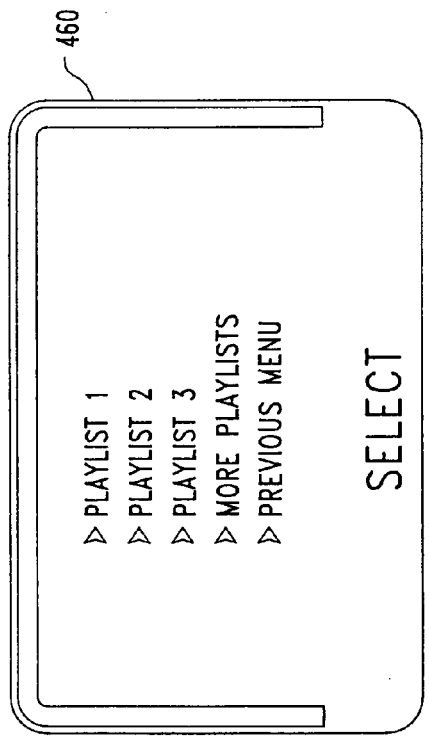

Turning to FIG. 5*d*, for purposes of this figure, it is assumed that the "Review Playlist" selection was made in FIG. 5*c*. Consistent with this selection, a playlist menu is illustrated in FIG. 5*d*. The present example illustrates the display of Playlists 1-3 as well as the option to select "More Playlists" wherein the choices corresponding to Playlists 4-6 may be displayed (not shown) along with continuing to display the "More Playlists" selection where still further playlists are available. While the playlists described here are generically numbered, the user may create customized names that are displayed in association with each playlist. For example, the artist's name and/or the title of the work may be displayed.

Selection of one of the playlists on the screen of FIG. 5*d* results in the presentation of screen 460 of FIG. 5*e*. Selection options are presented for "Song 1", "Song 2" and "Song 3". Selection of any one of these initiates playback of the associated song from electronic memory arrangement 300. Again, the songs have been generically numbered here, but the user is readily provided with the option of customizing the song names, for example, with the actual song title. Additional options may be selected in FIG. 5*e* including "More Songs" which presents the next three song selections and which may be repeated until the playlist has been exhausted. A "Load Playlist" selection returns the user to the display of FIG. 5*d*. The user may alternatively select "Edit Playlist" for the purpose of modifying an existing playlist or for creating a new playlist.

Figure 5G:
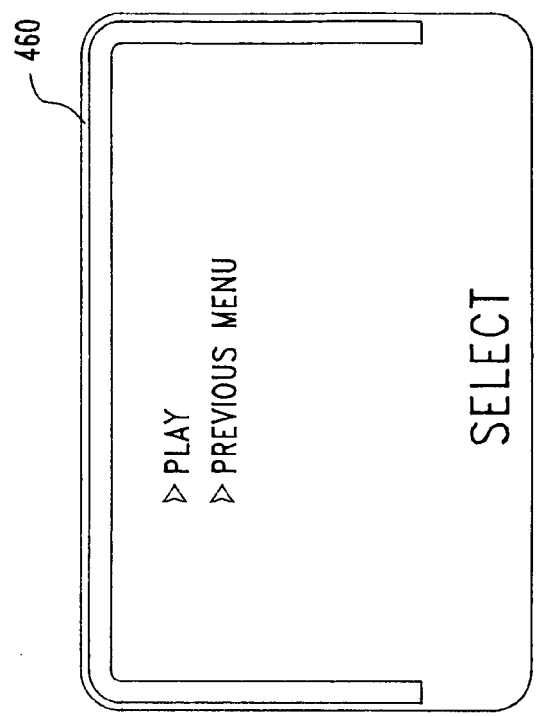
Figure 5F:
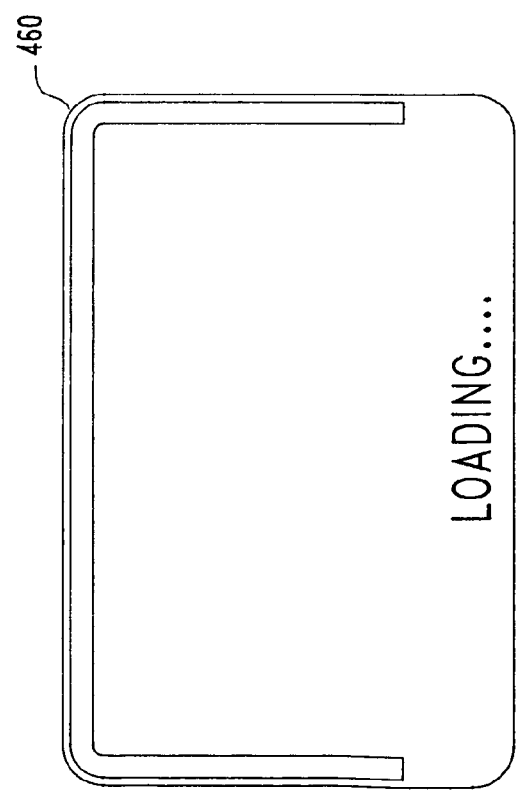

Referring to FIGS. 5*d* and 5*f*, selection of one of the playlists shown in the display of FIG. 5*d* that is available on Storage Element 320, but which is not currently available in electronic memory arrangement 312 requires transfer of the associated data from the Storage Element to the electronic memory arrangement. Consistent with the desire to protect the Storage Element during data accesses, as described above, the illustrated "Loading" screen or a similar such display may be presented to the user during the data transfer. This screen may be presented, for example, corresponding to the time during which the Storage Element is not in its aforedescribed safe state.

Referring to FIG. 5*g* in conjunction with FIG. 5*f*, after the Storage Element has returned to its safe state, a "Play" and "Previous Menu" selection are presented to the user. Generally, in this situation the user is awaiting availability of the playlist for immediate listening (i.e., viewing the display of FIG. 5*f*) and is thought to be very likely to wait the few seconds required until the display of FIG. 5*g* is presented in order to make the "Play" selection. Thus, the user is given the option to initiate playback only after the Storage Element is in its safe state. Any of the foregoing screen displays may be modified in any suitable manner while remaining within the scope of the present invention.

Referring again to FIG. 3, attention is now directed to certain aspects of the arrangement and operation of electronic components as part of Storage Element 300. In particular, a channel IC 500 is physically supported by and in electrical communication via main portion 330*b* of flexible circuit 330. A pre-amp IC 502 is also supported on portion 330*b* of the flexible circuit. One advantage attendant to positioning the channel IC on the flexible circuit resides in eliminating the need for a printed circuit board (PCB) as part of the Storage Element. It should be mentioned that main portion 330*b* of the flexible circuit is "wrapped" around flex carrier platform 356 such that signal routing and components may be mounted on the flexible circuit below the flex carrier platform. One component so positioned, in the present example, is a servo IC. Of course, such components are not visible in the present illustration. Main portion 330*b* of the flexible circuit may be bonded to platform 356 in any appropriate manner including, but not limited to the use of a suitable adhesive.

At first blush, it may appear that locating these three IC's in the Storage Element is readily accomplished. However, in the instance of channel IC 500, a number of complications, which are neither trivial nor obvious, must be overcome in order to locate it on the flexible circuit. Not the least of these complications relates to noise encountered on the flexible circuit. The various signals carried by the flexible circuit include, for example, control signals that are digitally generated with extremely fast rise and fall times; also referred to as "sharp edges". One of ordinary skill in the art appreciates that the edges of such high level control signals produce considerable interference in the form of radiated energy. At the same time, raw data passes through pre-amp IC 502 enroute to channel IC 500 after having been read by sensor arrangement 346. The combined presence of the low-signal-level raw data and the control signals at the flexible circuit is of concern with regard to potential corruption of the low-level signals. Processing performed by channel IC 500 on the flexible circuit introduces still further concern.

Still considering the location of channel IC 500, it is submitted that one of ordinary skill in the art, in order to cope with this interference problem, would position the channel IC almost anywhere but the flexible circuit, for example, on a printed circuit board. As exemplified by the IBM Microdrive, discussed above, the channel IC is part of the PCBA external to the HDA. The PCBA, in being isolated from and a separate part with respect to the HDA, is less subject to the interference that is present at the flexible circuit. Moreover, special interference provisions may be built into the area of circuitry associated with the channel IC. Such provisions can be quite intricate, based on the relatively vast amount of space available on the PCBA. Alternatively, one of ordinary skill in the art may place a separate PCB within the HDA assembly for mounting the channel IC. This latter arrangement is attractive to one of ordinary skill in the art again for the reason that the PCB can isolate the channel IC from the interference. One appealing aspect, stemming from the prior art and which is applicable to locating the channel IC on either form of printed circuit board, resides in the fact that locating components on printed circuit boards is far less expensive than locating such components on the flexible circuit.

The present invention resolves the foregoing interference problem by controlling signal characteristics using low level signaling (for example, 1-1.8 volts or less), as well as signal routing on the flexible circuit and IC pin-out locations.

With continuing reference to FIG. 2, the present invention recognizes a particular advantage that results from locating channel IC 500 on flexible circuit 330. In order to achieve optimized performance from a controller and particular HDA, the channel IC must be customized to the particular media and sensor combination of that HDA. That is, during normal production of a prior art hard drive, a programming step must be performed which controls the specific way in which the channel IC interacts with the HDA. Applicants are aware of no other way to achieve such optimized performance, short of programming yet another channel IC. Thus, in order to achieve optimum performance, the present invention recognizes that a "customized" channel IC must remain with its associated HDA after programming. In the prior art, programming functions directed to this customization or at least resources directed to executing them are generally permanently incorporated in memory associated with a hard drive controller on the PCBA of the hard drive. In the absence of channel customization, degraded or what may be referred to as "generic" performance is obtained from a particular channel and HDA combination.

Briefly considering the '751 patent, Applicants find no teachings with regard to customizing a channel IC that remains permanently associated with a particular HDA without an associated control arrangement. While the patent suggests locating the channel IC in the HDA, in the host computer or distributed therebetween, the patent is devoid of teachings with regard to selecting any one of these locations as being advantageous. Thus, only generic performance appears to be available.

With the channel IC in a distributed configuration or wholly within the host computer, customizing the channel is still further complicated. In particular, it should be understood that the '751 patent embraces a modular system approach wherein peripherals such as an HDA are provided separate from the host computer and typically originate from different vendors. One advantage of such modular systems is seen in the ability of even an end user to initially assemble the system and to add components, as needed. Under these circumstances, with all of the components coming together at the hands of the end user, there is no way in which a customized channel can be provided for any particular HDA and channel combination. In this regard, the present invention considers channel customization by an end user as impractical. The channel customization procedure, normally performed during manufacture, is generally time consuming. For example, customizing the channel for a 20 GB (capacity) hard drive may readily require 60 to 90 minutes. An even more compelling reason for avoiding the idea of end user customization of the channel IC is evidenced by the fact that the channel programming and test process serves in a quality control sense during manufacture. That is, an HDA/channel combination may be rejected at manufacture by failing to perform above a specified threshold.

The present invention considers dismissal of a quality control function, placed out of reach of the manufacturer, as unacceptable. Shifting such a manufacturing-oriented quality control function to the end user is likewise considered as virtually inconceivable. The alternative, inherently exhibited by the '751 patent, is to settle for generic performance levels. The present invention further rejects this latter alternative and provides a highly advantageous and heretofore unseen solution which is described hereinafter.

Referring to FIG. 3, it is initially important to understand that channel IC 500 is customized to magnetic media 340 and sensor arrangement 344 of Storage Element 320. The ability to provide a customized channel is attributable, in part, to the recognition that the channel IC is only programmable, from any standard of practicality, by the manufacturer of Storage Element 320. In this way, a value-added reseller may provide a device such as, for example, device 300 including Storage Element 320 configured for optimized performance, including a customized channel.

Still referring to FIG. 3, attention is turned to an additional advantage related to channel IC 500. Specifically, the latter includes a channel characteristics section 510 comprising a nonvolatile area which contains certain information related to the configuration of the Storage Element. This information may include, for example, the storage capacity of the Storage Element, and the attributes of the section of the disk containing the system configuration. The purpose in providing channel characteristics section 510 resides in configuring the Storage Element such that anticipated and/or typical changes in the Storage Element do not necessitate changes in other portions of the Storage Element such as, for example, in processing arrangement 302. That is, the processing arrangement within an overall host device may be configured to read the channel characteristics section, for example, during an initial boot-up sequence to provide for appropriately accessing the Storage Element. In this way, a single processing arrangement may access a variety of different Storage Element configurations with no attendant modification of the processing arrangement required.

Attention is now directed to a number of other highly advantageous features of the present invention which protect the Storage Element from the effects of mechanical shock and which generally enhance its reliability. As described above, HDD's are susceptible to failure when the head or heads contact the media, for example, as a result of reception of a mechanical shock which is sufficient to move the head arrangement. In the absence of rotation of the media, the failure is usually catastrophic since the heads will become stuck to the media; relative movement will thereafter tear the head(s) from the actuator arm. One arrangement for parking the head arrangement is described in U.S. Pat. No. 4,933,785 issued to Morehouse et al (hereinafter Morehouse). The latter describes a ramp configuration wherein the head arrangement rides against the ramp to be received in its parked position by seating in some sort of detent formed in the ramp.

Once the head arrangement is in the parked position, latching arrangements are typically relied on to restrain movement of the head arrangement as a result of mechanical shock. While prior art ramp parking arrangements and cooperating latching arrangements are generally suited to their intended applications, it is submitted that such arrangements remain susceptible to certain problems which, until now, remain unresolved. For example, a controller may initiate parking of the head arrangement, however, the head arrangement may not fully transfer to its parked position. That is, the head arrangement may slide only partially up the ramp, failing to reach the detent. Alternatively, the head arrangement may engage the ramp with too much momentum—sliding up the ramp only to hit and bounce off of a hard stop at the end of the ramp, stopping away from the detent and out of position. In either situation, it is quite likely that a latching arrangement will thereafter be incapable of restraining movement of the head arrangement since such latching arrangements are normally designed under the presumption that the head arrangement is at least initially located in its parked position (i.e., seated in the detent). Moreover, particularly for shock forces which tend to move the head arrangement down the ramp and toward the magnetic media, the magnitude of force required to initiate movement is significantly reduced, as compared to starting with the head arrangement seated in the detent. At the same time, the controller (processing arrangement) is unaware of this status which is likely to soon result in a catastrophic drive failure.

The foregoing discussion evidences a void in the prior art with respect to recognizing a need for monitoring at least certain aspects or attributes which are related to the operational status of an environmentally sensitive electromechanical data storage arrangement. The present invention, in contrast, recognizes this need, particularly with regard to implementation in portable devices. Attributes of concern at the Storage Element of the present invention include, but are not limited to positional status of the head arrangement, rotational status of the spin motor, environmental temperature at the Storage Element and the shock environment being experienced. Once a view to these attributes is provided, appropriate responses may be formulated, as will be described in the context of a number of attributes immediately hereinafter.

Figure 6:
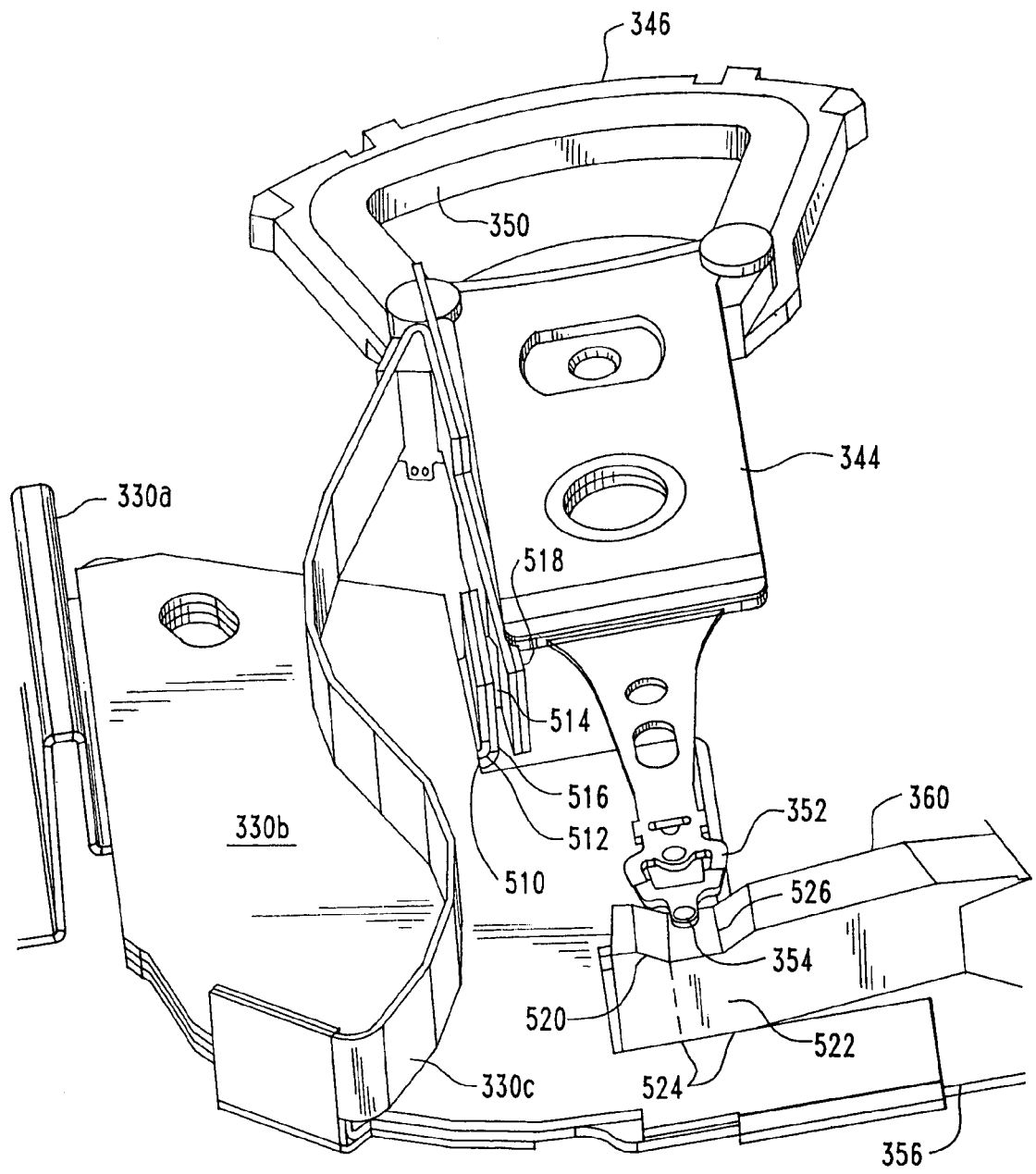
FIG. 6 is a diagrammatic illustration, in perspective, of a portion of the Storage Element of the present invention, shown here for the purpose of describing several embodiments of a highly advantageous head arrangement position sensor.

Referring to FIGS. 3 and 6, attention is now directed to a highly advantageous actuator arm position sensor. These figures illustrate actuator arm 344 in the parked position. Consistent with terminology of the art, this position may be referred to as having the "heads unloaded". Conversely, the term having the "heads loaded" may refer to the position when the actuator arm or head/transducer arrangement is positioned for reading magnetic media 340. FIG. 6 illustrates a portion of Storage Element 320 including actuator arm 344, portion 330b of flexible circuit 330 supported by flexible carrier platform 356 and ramp 360. It is noted again that the flexible circuit "sandwiches" flexible carrier platform 356. In the illustrated actuator arm position sensor implementation, a tab 510 is integrally formed using a portion of the flexible carrier platform, with the tab thereafter being bent upwardly. A tab portion 512 of the flexible circuit is formed integrally with that portion of the flexible circuit which is beneath flexible carrier platform 356, as seen in FIG. 6. Tab portion 512 of the flexible circuit may be attached to support tab 510 in any suitable manner such as, for example, using a suitable adhesive. A contact button 514 is arranged on and supported by tab portion 512. A conductive trace, which is not visible in the present illustration, is integrally formed with the flexible circuit and connects electrically with contact button 514. Electrical monitoring of the status of the contact button is thereby provided for any monitoring arrangement having access to the flexible circuit such as processing arrangement 302 shown in FIG. 2. Contact button 514 may be formed using, for example, a solder bump, a dimple formed in the flex circuit, a protrusion in the underlying flexible carrier platform which "outsets" the contact area or any suitable combination of such design concepts. It should be appreciated that the use of a flexible circuit and carrying platform is not a requirement. For example, a stationary contact configured to engage the actuator arm in the parked position may be supported in any suitable manner including directly by the housing of the Storage Element. Alternatively, a component carrying substrate may be used in place of the combination of the flexible circuit and carrying platform.

Still referring to FIG. 6, as previously described, a portion of the flexible circuit comprises flex actuator arm connection 330c. A portion of this latter element extends from the position at which it is received by the actuator arm along the length of the arm to an electrical contact area 516 supported by a contact support surface 518. The contact support surface may be integrally formed with the actuator arm or produced separately therefrom for suitable attachment to the actuator arm. Electrical contact area 516 may be fixedly attached to the contact support surface in any suitable manner such as, for example, by using an adhesive. Actuator arm 344 is shown in its parked position with lift tab 354 seated in a detent 520 formed in ramp 360. Contact button 514 and contact area 516 are arranged such that electrical contact is maintained between these latter two elements when the actuator arm is in its parked position. In this regard, flex actuator arm connection 330c (see FIG. 3) of the flexible circuit is used to apply a resilient bias whereby to maintain such electrical contact in the absence of mechanical shock forces below a predetermined threshold value. The flex actuator arm connection arm or dynamic loop may be configured in any suitable manner to this end. While FIG. 3 illustrates a configuration having primarily one bend, an "S" curve, as shown in FIG. 6, is considered as being particularly effective. It should be appreciated that this overall contacting arrangement may be modified by one having ordinary skill in the art in any number of alternative ways. For example, the actuator arm is generally at ground potential. Rather than button 514 contacting the flexible circuit, the button may contact the grounded body of the actuator arm so as to bring the button and flexible circuit trace in communication therewith to ground potential.

With continuing reference to FIG. 6, another actuator arm position sensor implementation will be described. Specifically, ramp 360 is formed having an electrically conductive volume 522 defined between a pair of dashed lines 524. Conductive volume 522 itself defines a landing surface 526 which contacts lift tab 354 in the parked position. Volume 522 extends to a lowermost surface of the ramp proximate to flexible circuit 330b. A contact pad (not shown) may be formed as part of the flexible circuit, having an associated trace for external communication, to maintain electrical contact between the ramp conductive volume and the flexible circuit contact pad. In accordance with this arrangement, ramp 360 may be formed, for example, by injection molding using Teflon® for non-conductive portions of the ramp and carbon filled Delrin® for electrically conductive volume 522. The lift tab is generally at ground potential by virtue of electrical communication with the actuator arm. When lift tab 354 contacts the landing surface, conductive volume 522 and the associated trace in the flexible circuit are brought to ground potential. Of course, as an alternative to a grounded lift tab, a separate, electrically isolated conductor [not shown] may be routed to the lift tab along the length of the actuator arm for purposes of contacting landing surface 526 using an appropriate arrangement on lift tab 354.

With regard to both implementations of head arrangement/ actuator arm position monitoring mechanisms, it should be appreciated that an unlimited number of modifications may be made by one having ordinary skill in the art in view of this overall disclosure. All such modifications are considered to reside within the scope of the appended claims. Irrespective of the specific manner in which the actuator arm position monitoring arrangement is implemented, the advantages provided through its use are considered to provide sweeping and heretofore unavailable improvements in a number of areas, as will be described at appropriate points hereinafter.

Figure 7:
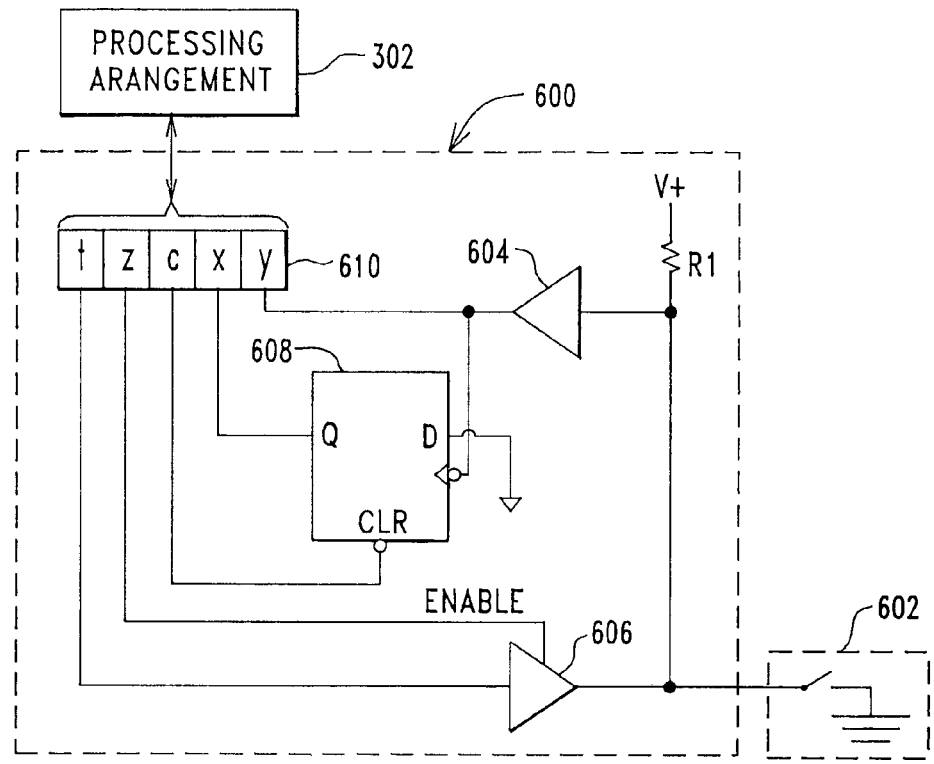
FIG. 7 is a schematic block diagram illustrating a position sensing circuit interfaced with the head arrangement position sensor of FIG. 6.

Turning now to FIG. 7, an actuator arm position monitoring circuit is generally indicated by the reference number 600, as shown within a dashed box. This latter circuit generally forms a portion of the Storage Element and cooperates with the actuator arm position monitoring sensor of the present invention, as diagrammatically illustrated and indicated by the reference number 602 in the form of a switch within a dashed box. Any form of actuator arm position monitoring sensor may be used, as described above or with suitable modifications. Circuit 600 includes signal drivers 604 and 606, a flip-flop 608 and a data register 610 storing five bits of information denoted as bits t, z, c, x and y. Register 610 is, in turn, accessible to previously described processing arrangement 302. As mentioned above, in certain implementations where a transitional IC is used, register 610 may be accessed by the processing arrangement using one or more vendor unique commands. Alternatively, the register is read directly by the processing arrangement. A resistor R1 is connected to a V+ power supply so as to pull-up the output of driver 606 along with the line leading to the actuator arm positioning arrangement, as will be described.

Processing arrangement 302 reads the status of actuator arm position monitoring circuit 600 using bits x and y. Bit y indicates a current status of the actuator arm position sensor. Signal driver 604 provides the current status value both to the y register position and to a clock input of flip-flop 608. Other implementations may set D to a high logic level. In the present example, the D input of flip-flop 608 is grounded. The x register value comprises an output Q of flip-flop 608, as will be further described. It should be appreciated that high and low logic levels are not generally used in the present discussion with regard to state indication since the circuitry is readily adaptable to use either logic value as a "true" value. Accordingly, a value indicative of the actuator arm sensor being in its closed position is considered as true. The z register comprises an enable signal provided to an enable input of signal driver 606 which may be set by processing arrangement 302, as desired. The t register position allows processing arrangement 302 to provide a logical value that is driven onto the output of signal driver 306 when the latter is enabled by the appropriate value stored in the z register position. In this way, test functionality is provided whereby a selected value may be placed on the output of signal driver 606, irrespective of whether the actuator arm sensor switch is in its open position. The test value is then available in register y via signal driver 604 for access by processing arrangement 302. The test value read from the y register location can then be compared by the processing arrangement with the expected value to confirm proper operation of the circuitry.

For purposes of monitoring the status of the actuator arm position sensor during operation of the Storage Element, flip-flop 608 may initially be reset by processing arrangement 302 upon movement of the actuator arm away from the parked position. That is, the x register value is reset while the actuator arm position sensing switch is open (false) using the c register position. Accordingly, during ongoing access of media 340 (FIG. 3) the x and y register locations both store a false value. The x and y register values will change, however, once the actuator arm returns even briefly to the parked position. Initially, it is assumed that the actuator arm reaches the parked position so that lift tab 354 seats properly in detent 520. Once the actuator arm position sensor (in any of the aforedescribed implementations) switches to the true state, a true value is presented by signal driver 604. This value is stored in register location y. At the same time, the true value is presented to the clock input of flip-flop 608. Any voltage waveform edge provided to the clock input of the flip-flop will cause the output of the flip-flop to toggle to the true value which is then saved in register location x, as provided from the Q output of the flip-flop. Thus, both the x and y registers store a true value. Upon reading this condition, processing arrangement 302 is substantially assured that the actuator arm is in the parked position. The foregoing describes parking in a "normal" manner. That is, the actuator arm is moved away from accessing the magnetic media with just enough energy to slide lift tab 354 up the sloped face of ramp 360 to thereafter seat and be captured in detent 520.

Having described the result that obtains relative to monitoring circuit 600 when the actuator arm parks normally, various scenarios will now be considered in which the actuator arm fails to reach the parked position in the normal manner. In a first scenario, the actuator arm is simply moved with an insufficient amount of energy such that lift tab 354 may engage the sloped face of ramp 360, but fails to reach detent 520. In this case, the x and y values will both remain false. Upon sensing this condition, processing arrangement 302 is substantially assured that the actuator arm is not parked or unloaded. One of ordinary skill in the art will appreciate that the Storage Element or any HDD, for that matter, is in grave danger of catastrophic failure in this scenario. The present invention, by producing an unequivocal indication of this danger, provides that appropriate remedial actions may then be taken, as described at appropriate points below.

In a second scenario wherein the actuator arm fails to park normally, the actuator arm is moved away from a loaded position with excessive force applied thereto by the voice coil motor. In this regard, it should be appreciated that the actuator arm is generally configured to encounter a stop (not shown) which prevents the actuator arm from overshooting ramp 360. Unfortunately, however, the actuator arm may bounce off of the stop. Actuator arm position sensor circuit 600 will initially toggle to true values for both the x and y registers. As a result of the bounce, however, the y register value then toggles to false. Processing arrangement 302 observes a true value for x and a false value for y. Generally, this status seen in the x and y registers is indicative of a bounce. The Storage Element or HDD employing this arrangement is again in danger of catastrophic failure. Upon this observation, remedial measures may be taken by processing arrangement 302 including modification of the drive signal provided to the voice coil motor, as will be further described.

Figure 8:
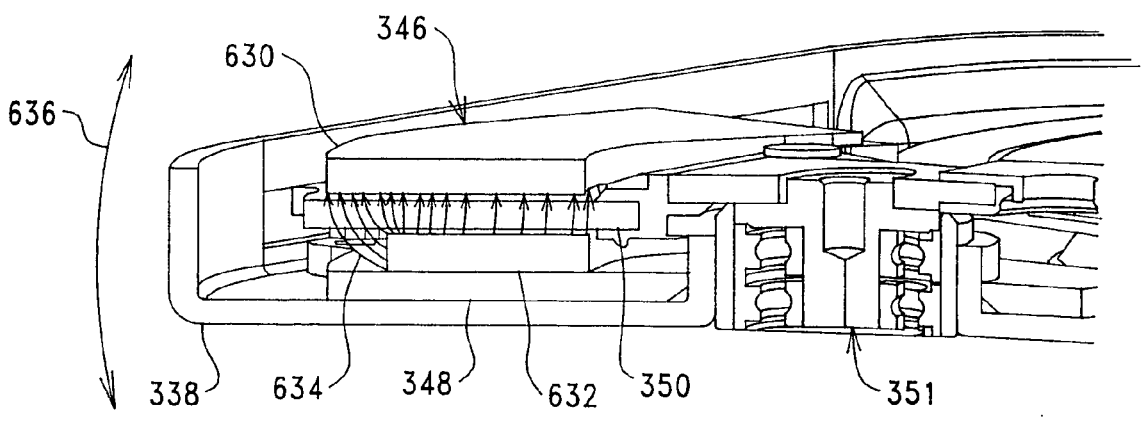
FIG. 8 is a partial cut-away diagrammatic view of the voice coil motor arm end of the Storage Element of the present invention, shown here to facilitate discussion of a highly advantageous mechanical shock sensing arrangement implemented in accordance with the present invention.

Attention is now directed to FIG. 8 which is a partial cut-away view of voice coil motor end 346 of actuator arm 344. Voice coil 350 is shown positioned between lower magnetic plate assembly 348 and an upper magnetic plate assembly 630. A magnet 632 forms part of the lower magnet assembly for producing a static magnetic field between the upper and lower assemblies. Actuator pivot 351 is also shown. Lines of magnetic flux are indicated by the reference number 634 extending between the lower and upper magnet plate assemblies, cutting through voice coil 350. Applicants have recognized that the voice coil end of the actuator arm exhibits a resonant frequency in a direction indicated by a double-headed arrow 636. Applicants, more importantly, have recognized that, because the voice coil is positioned in a magnetic field, an opportunity is provided for a remarkably advantageous technique and arrangement directed to monitoring the shock environment of the Storage Element as an operational attribute in the context of operation of the Storage Element of the present invention.

Figure 9:
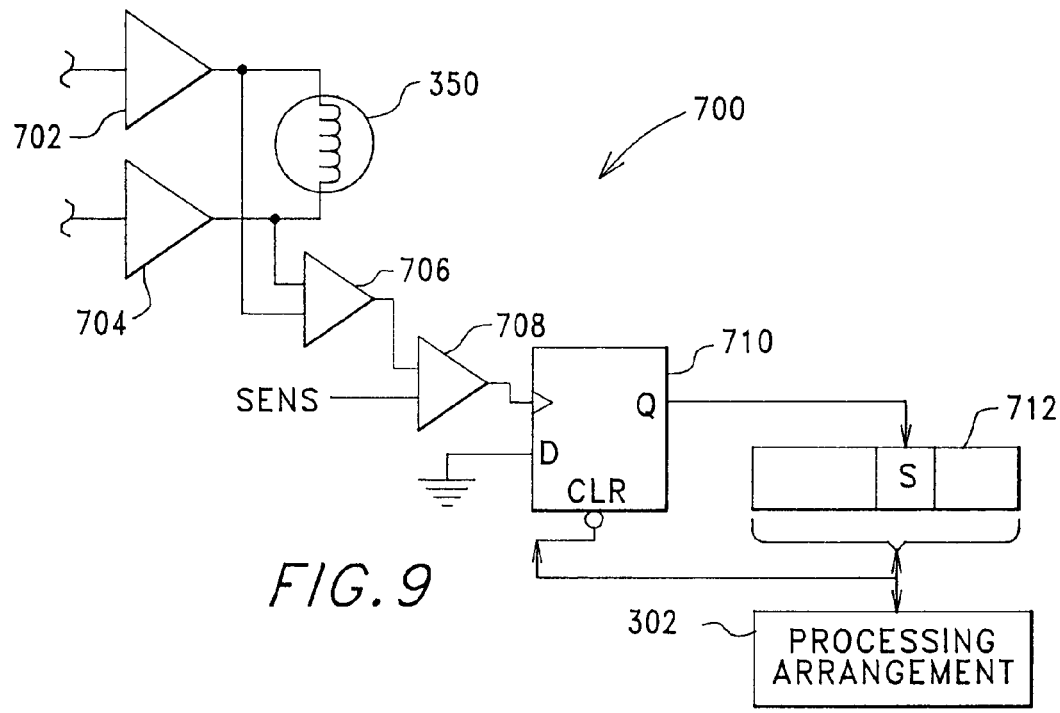
FIG. 9 is a schematic block diagram illustrating a mechanical shock sensing circuit interfaced with the mechanical shock sensing arrangement of FIG. 8.

Referring to FIG. 9 in conjunction with FIG. 8, details with regard to monitoring the shock environment of Storage Element 320 will be described. In view of the foregoing discussion, it should be appreciated that the voice coil motor end of actuator arm 344 vibrates normal to its plane of motion for data access at its resonant frequency responsive to the Storage Element being subjected to external shock forces having a component that is normal to the plane of the actuator arm. Accordingly, voice coil 350 will move consistent with the direction illustrated by arrow 636. Since the voice coil is exposed to magnetic flux lines 634, a voltage is generated by the voice coil responsive to this motion. Generation of this voltage has been empirically verified by Applicants. FIG. 9 illustrates one possible mechanical shock monitoring circuit, generally indicated by the reference number 700, for utilizing the shock voltage. Voice coil 350 is diagrammatically shown. The voice coil is electrically connected to a pair of drivers 702 and 704 that are themselves driven by control circuitry which has not been illustrated for purposes of simplicity. A conditioning circuit 706 includes high impedance inputs connected across voice coil 350 to pick up the shock voltage signal induced in the voice coil. Conditioning circuit 706 may include any necessary functions such as, for example, amplification and filtering. It should be appreciated that the signal level of the induced shock voltage may be quite small such that significant gain is required in order to increase the signal to a useful level dependent, of course, on the specific configuration of the voice coil motor arrangement and the level of shock to be detected.

Continuing with a description of the circuitry of FIG. 9, a comparator 708 compares the output of signal conditioner 395a to a set point input of the comparator provided on a line indicated as "sens". This latter line serves as a sensitivity adjustment which may be under the control of processing arrangement 302. Moreover, the processing arrangement may vary the sensitivity adjustment in accordance with various operational circumstances. Alternatively, the sensitivity may be set during factory calibration procedures. In the event that shock voltages are presented to the comparator which exceed the current sensitivity setting, comparator 708 produces a square wave output that is received by a clock input of a D type flip-flop 710. The D input of flip-flop 710 may be set to either a high or low logic level with the latter being illustrated. Upon receipt of an input edge from comparator 708, flip-flop 710 toggles output Q which then is loaded into a register 712 as a bit "s". Like previously described register 610, register 712 may be located within the Storage Element or on the host side proximate to processing arrangement 302. Any location is suitable so long as it is readable by processing arrangement 302. Flip-flop 710 is reset using its clear input connected to a line that is controlled by processing arrangement 302. The flip-flop may be reset immediately after reading the s bit or within the context of ongoing processing operations. Upon detecting that the s bit is set, processing arrangement 302 may respond in a number of alternative ways, as will be described below.

Referring to FIG. 2, as described above, entering the shock safe state of the Storage Element requires parking or unloading sensor/head arrangement 344. In this regard, the present invention recognizes that an awareness of the position of the head arrangement is critical to ensuring the reliability of Storage Element 320. Having described several implementations of the head arrangement sensing feature of the present invention, attention will now be directed to using this feature in the context of a number of highly advantageous techniques.

The shock environment sensing arrangement of the present invention is considered as being highly advantageous, particularly with regard to devices such as Storage Element 302 that are intended for use in portable applications. As described previously, the shock monitoring feature of the present invention allows the processing arrangement to gauge the shock environment of device 300 prior to initiating data storage or retrieval using the Storage Element. This feature is readily combined with any other provision described herein for the purpose of mitigation of mechanical shock effects on the operation of the Storage Element. Moreover, the shock environment is sensed within the Storage Element itself so as to account for attenuation of shock forces resulting from shock mounting the Storage Element within a portable device. Shock monitoring capability is also highly advantageous during test and development of the Storage Element and is readily suited to any form of device, including an HDD, which utilizes a voice coil motor.

Initially, it is noted that a number of prior art algorithms have been developed for the specific purpose of parking the head arrangement. Such an algorithm may be implemented in a variety of different ways for this intended purpose. Each individual algorithm may therefore operate incorporating one or more parameters, each of which influences the reliability or probability that the head arrangement will, in fact, properly reach the parked position. Such parameters may include, for example, the magnitude of a drive current which is used to drive the voice coil motor in moving to the parked position, a specified position of the head arrangement from which movement to the parked position is initiated and the velocity of the head arrangement. Accordingly, the focus of the present invention considers adjustment of any parameters that are in use within a particular algorithm in order to improve parking reliability. That is, the effect of adjusting any one parameter or parameter combination is discernible through the teachings herein.

Figure 10:
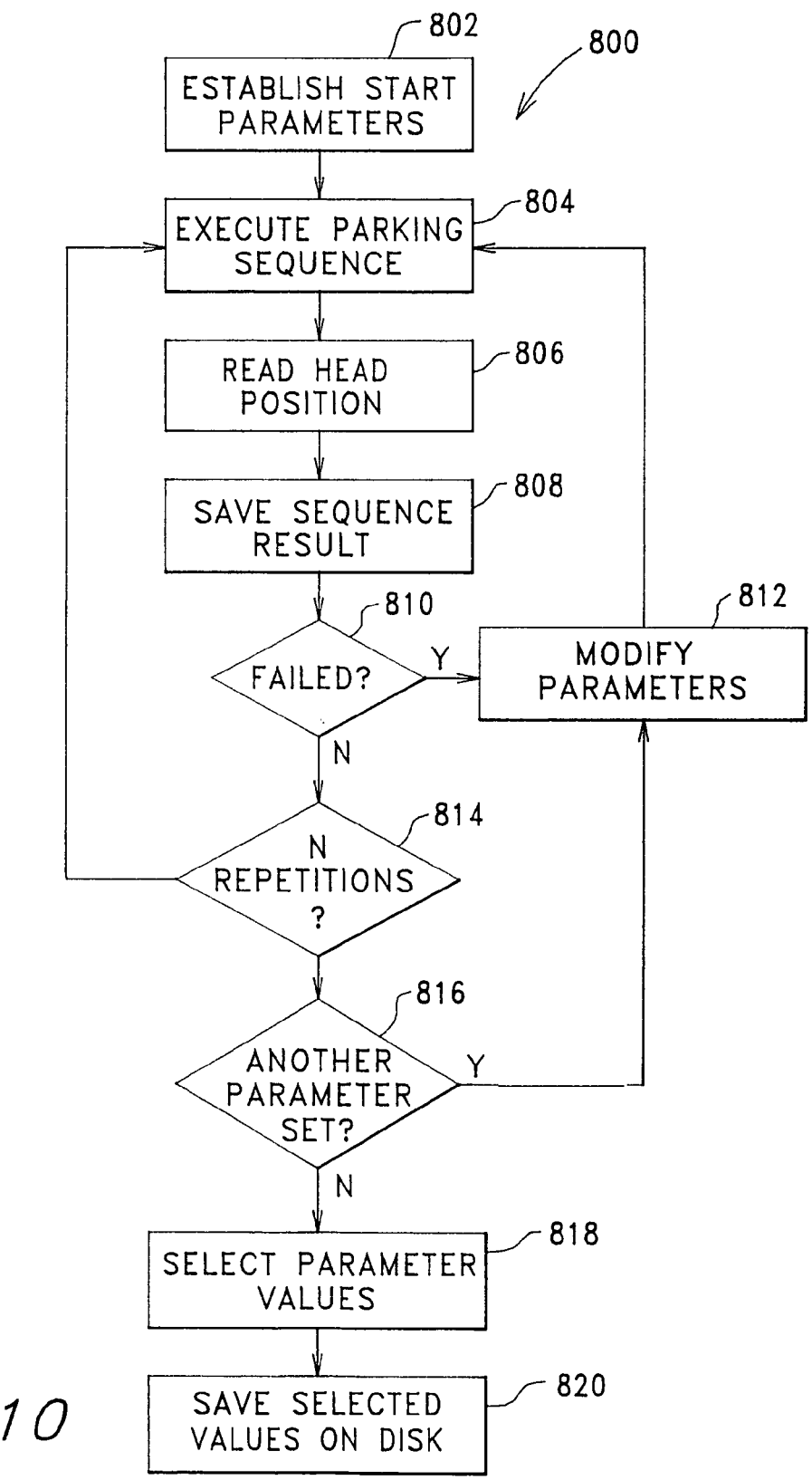
FIG. 10 is a flow diagram illustrating one possible implementation of a parking calibration method performed in accordance with the present invention and utilizing the highly advantageous head position sensing arrangement of the present invention.

Turning now to FIG. 10, a parking calibration method performed in accordance with the present invention is generally indicated by the reference number 800. Calibration method 800 begins with a step 802 in which initial values of the parameters are set within the particular parking sequence or algorithm to be applied. Thus, the initial values may represent values which have been developed in any suitable manner. Step 804 then proceeds by using the initial values of the parameters to actually execute the parking sequence. A read of the head position indicator of the present invention is subsequently performed by step 806. Step 808 then saves the result of this particular parking sequence execution, indexed against the specific values of parameters which were employed. Following step 808, step 810 tests the result of the current parking sequence. In the event that this sequence failed, execution moves to step 812 in which one or more parameters are modified, as desired. As described above, one significant parameter is the magnitude or duration of the signal used as a drive signal to drive the voice coil motor arrangement in order to move the head arrangement to the parked position. For illustrative convenience, parameter changes may be described with regard to modifying this voice coil motor drive signal. It is to be understood that this technique is equally applicable to virtually any parameter and, hence, is in no way limited to the voice coil motor drive signal.

For the voice coil motor drive signal, the initial parameter setting may use a particular magnitude that is changed by some predetermined increment with each successive repetition of the parking sequence. It is to be understood, in this regard, that a failure condition is typically encountered by both increasing and decreasing the voice coil motor drive from the particular magnitude. In one instance, increasing the drive current sufficiently results in the head arrangement bouncing off of the parking arrangement; the head arrangement passes through the parked position twice. In the other instance, decreasing the drive current sufficiently results in the head arrangement having insufficient momentum to fully reach the parked position. Therefore, the voice coil motor drive current exemplifies a parameter which exhibits both upper and lower failure values or thresholds. That is, this parameter is adjustable both up and down in order to find an optimum value. In one feature, the optimum value may be selected as that value which is approximately half-way in magnitude between the upper and lower magnitudes at which failure occurs. Other parameters likewise exhibit upper and lower failure values such that this precept remains equally applicable thereto. When performing calibration sequences relating to parameters having both upper and lower failure limits, it may be advantageous to vary the parameter from a higher or low magnitude which is almost certainly outside of the operational range that is defined between the upper and lower failure limits. In this way, the calibration procedure sweeps or passes through the entire operational range between the limits such that both the upper and lower limits can be found in one pass through the entire range of potential magnitude of that parameter. Following parameter modification, execution moves back to step 404 to begin the parking sequence with the modified parameters.

Still referring to FIG. 10, if step 810 does not detect a failure in the parking sequence, step 814 is entered. This latter step monitors the overall number of times that the parking sequence has been repeated for a particular configuration of the parameters. If the current configuration of parameter settings has not been repeated N times, execution is returned to step 804. The parking sequence will generally be repeated a statistically significant number of times, indicated here as N, for each configuration of the parameters so as to establish a probability of the head arrangement reaching the parked position for that particular configuration. For example, N might be equal to 100. A single failure in attempting to reach the parked position out of 100 tries will generally be considered as unacceptable, indicating a failure threshold.

If, on the other hand, the current parameter configuration has been successfully repeated N times, step 816 is entered. In step 816, a decision is made as to whether the parking sequence is to be repeated with a different configuration of the parameter settings. If that is the case, step 812 is executed whereby to modify the parameters followed again by step 804. It should be appreciated that the specific implementation of step 816 is dependent upon the particular algorithm that is employed by the parking sequence. Therefore, the parameter set may be modified in a manner that is suited to the particular algorithm. In this regard, it is considered that one having ordinary skill in the art is capable of modifying any known algorithm parameter set either currently known or yet to be developed in view of this overall disclosure. One possible implementation might optimize one of the parameters which is initially considered to be the most critical. Thereafter, other parameters within the group of parameters defined by the particular algorithm may be modified on an individual basis. Still further modifications may include changes made to more than one parameter at a time.

Different calibration procedures may be employed dependent upon the state of product development. For example, a rather exhaustive search for an optimum set of parameters may be performed using a relatively great number of parameter configurations on a certain number of units produced in an initial production run. Having found that initial set of optimum parameters, the parameter calibration process may thereafter be relaxed somewhat, using a lesser number of parameter configurations.

Once step 816 determines that all of the parameter modifications targeted for execution have been completed, a probability set comprising all of the values used in the parameter configurations is available. Step 818 is performed whereby to choose the set of parameters to be employed for operational purposes using the probability set. A number of different objectives may be brought to bear in selecting the optimized set of parameters. As mentioned above, one possible selection resides, for "two-valued" parameters, in choosing a midpoint between upper and lower failure values. It is to be understood, however, that other objectives may also be considered. In the example of the voice coil motor drive current parameter, a magnitude may be selected that is somewhat closer to the lower failure limit for purposes of power conservation. This objective is particularly applicable in the instance of portable devices which operate on battery power.

In one highly advantageous feature, step 820 saves the optimized parameters on the magnetic media using the head arrangement. During operation of the Storage Element, these parameters are retrieved and employed by the processing arrangement, as will be further described at an appropriate point below. Therefore, each and every unit produced may operate with a customized set of parameters in terms of parking calibration as well as other aspects of operation, as will be further described.

Figure 11:
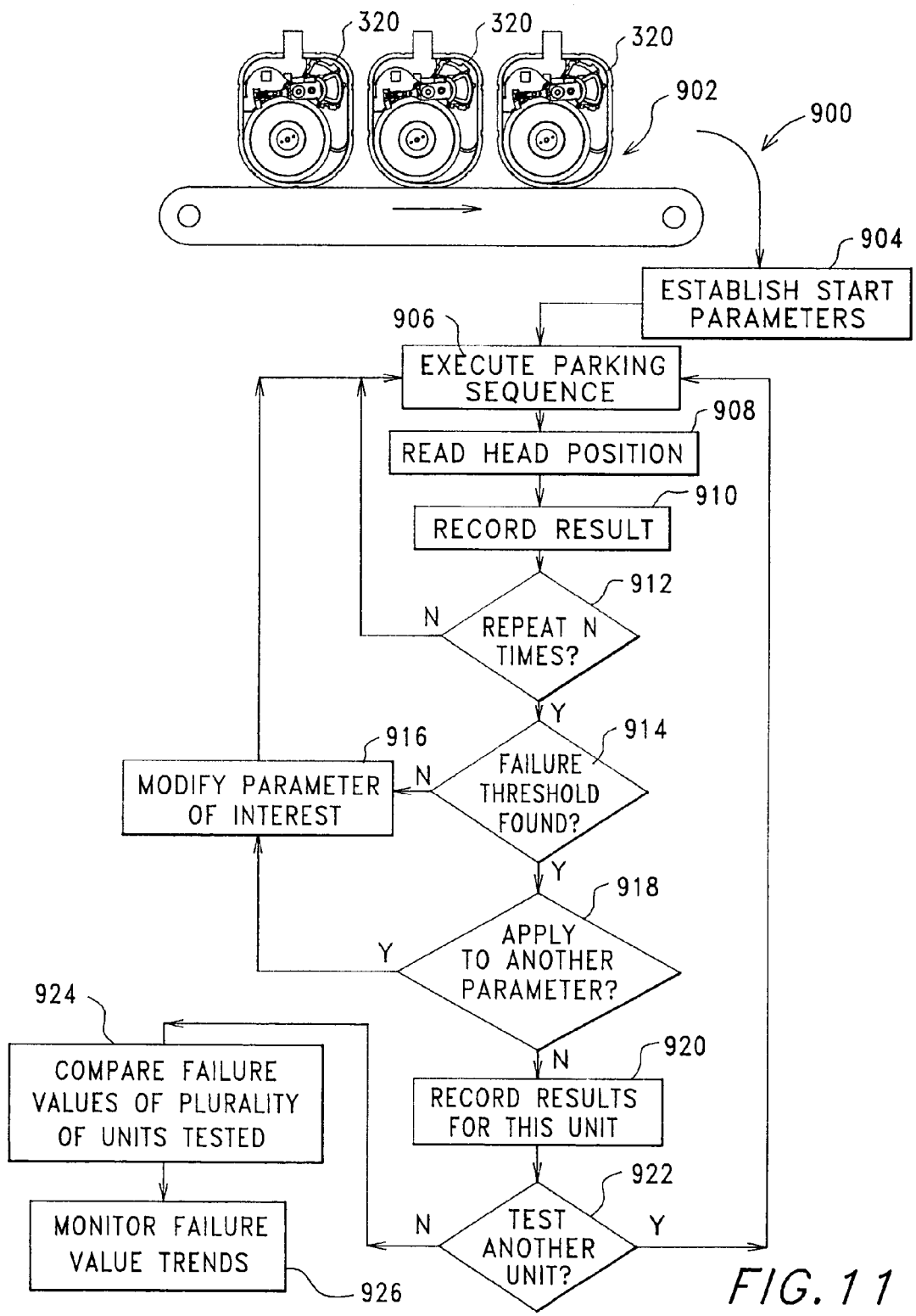
FIG. 11 is a flow diagram illustrating one possible implementation of a parameter tracking method performing in accordance with the present invention and utilizing the head position sensing arrangement of the present invention.

Referring now to FIG. 11, a highly advantageous parameter tracking method is generally indicated by the reference number 900. It is noted that this tracking method may be performed as an adjunct to the foregoing calibration procedure, as will be further described. A production line is generally indicated by the reference number 902 having a plurality of Storage Elements 320 coming off of the line for entry into method 900. Initially, it should be understood that this method is advantageous in tracking changes that are occurring in the Storage Element, but which nonetheless might otherwise go unnoticed, at least until these changes reach critical levels. Since different components which make up the Storage Element are likely to be sourced from different vendors, it is possible that sufficient changes in one of these components, even where the vendor is unaware of drifting tolerance or composition changes, could ultimately produce fatal problems during operation. The present invention, through the use of its head sensor position indication arrangement, contemplates tracking performance drift in relation to certain characterizable aspects of performance. This overall technique may be referred to hereinafter as "trend characterization" or "parameter tracking".

Still referring to FIG. 11, method 900 begins by initially establishing start parameters in step 904. It should be appreciated that several different approaches may be employed with regard to setting the start parameters. In one approach, the parameters may be set so that failure to reach the parked position is virtually assured. The parameters may then be adjusted in a direction toward what is known to be an operational value or range of operational values, in the case of a parameter having both upper and lower failure limits. In this manner, the failure threshold(s) for each individual parameter and for subsets and/or the overall set of parameters may be established, as desired. In another approach, the parameters are initialized in what is thought to be an optimized or at least operational state. The parameters are then adjusted in one or both directions toward the failure threshold(s). Again, individual parameters may be adjusted so as to find the failure threshold(s) of each parameter as well as finding associated failure thresholds for subsets of parameters and the overall collection of parameters. Any set of values for the parameters at which a failure threshold is present may be referred to as a failure configuration.

Step 906 executes the parking sequence using the initial set of starting parameters. It is noted that execution of the parking sequence throughout this overall disclosure is assumed to begin from having the head arrangement positioned for reading from the magnetic media or from some defined, but unparked position from which the parking sequence algorithm is designed to start. In fact, this starting position may comprise one of the parameters of the parking sequence algorithm. The starting position may define a lower failure limit or threshold nearest the parking arrangement and an upper failure limit somewhat further away from the parking arrangement.

Step 908 then reads the head position to establish whether or not the head arrangement reached the parked position. In step 910, the result of step 908 is recorded for subsequent use. Step 912 then tests the number of times that the parking sequence has been repeated. In this regard, the parking sequence may be repeated any number of times for a particular set-up of parameters so as to assure a sufficiently accurate determination of the probability of parking at those settings. As one alternative, during this repetition of the parking sequence, the incidence of one failure may immediately move the procedure to modification of the parking parameters.

Having repeated the parking sequence for a particular setting of the parameters N number of times, step 914 establishes whether or not a failure threshold was found in view of the results stored in step 910. If a failure threshold was not found, step 916 modifies the parameter settings in a manner that is consistent with the parking algorithm being employed. Thereafter, step 906 re-executes the parking sequence. Operation continues to establish whether or not a failure threshold is found for the new settings of the parameters. When a failure threshold is found for a particular configuration of the parking parameters, step 918 saves the failure configuration and determines whether the method is to be applied to a different parameter, subset or the overall group of parameters. If so, the foregoing process is repeated. Otherwise, step 920 records the results for the particular unit having just been tested in the form of all of its failure configurations of interest. Step 922 then checks for another unit to be tested. Accordingly, any number of units may be tested from an individual production run. More importantly, this overall process is applicable over long-term periods of time. For example, across the entire number of Storage Elements produced having a particular model number. From time to time, step 924 is employed whereby to compare the recorded failure configurations and specific values across all of these units. Step 925 is then used to establish trends in failure values with continued production of the unit. Thus, impending problems may be averted. As an example, if frictional coefficients are trending upward as a result of changes in the composition from which ramp 360 (see FIG. 3) is formed, the lower recorded failure threshold value for the drive current required to park the head arrangement will be observed to be trending upward. With this trend information in hand, an investigation may be undertaken to ascertain what is causing the increase in the required magnitude of current. In this manner, any number of developing problems may be identified. Applicants consider this process as being highly advantageous, since operational conditions are maintainable well separated from ascertained failure thresholds.

Although methods 800 and 900, illustrated in FIGS. 10 and 11 respectively, are described separately for purposes of clarity, it should be appreciated that these methods are combinable in view of this overall disclosure. That is, essentially all of the foregoing calibration and trend tracking information may be determined once threshold value limits embraced by failure configurations for the parameters in any particular parking algorithm have been established. In this regard, the steps of the described methods may be changed in sequence and/or modified in any suitable manner so long as the teachings herein are applied. Moreover, these methods are considered to be applicable to the production of virtually any hard disk drive. The benefit of an optimized parking algorithm will significantly enhance reliability of any hard disk drive through application of the teachings herein.

Having described the use of the head arrangement sensing feature of the present invention for the purpose of calibration and trend tracking, attention is now directed to certain aspects of the use of this feature during operation of the Storage Element or, of course, during the operation of any hard disk drive produced having the head arrangement sensing feature of the present invention. As mentioned above, an awareness of the position of the head arrangement is critical to reliable operation of any hard disk type storage arrangement, particularly when the head arrangement is supposed to be parked. That is, if the head arrangement is inadvertently moved away from its parked position, for example, due to the receipt of an external shock force, its transducer is likely to be torn lose as a result of non-rotational contact with the magnetic media disk. The head arrangement sensing feature of the present invention is highly advantageous, in the first instance, by providing the ability to actually confirm that the head arrangement has been received in the parked or unloaded position. Moreover, having initially confirmed that the head arrangement is received in the parked position, its status may readily be re-confirmed, as desired. One particular application for the use of head arrangement sensing feature of the present invention will be described immediately hereinafter.

Figure 12:
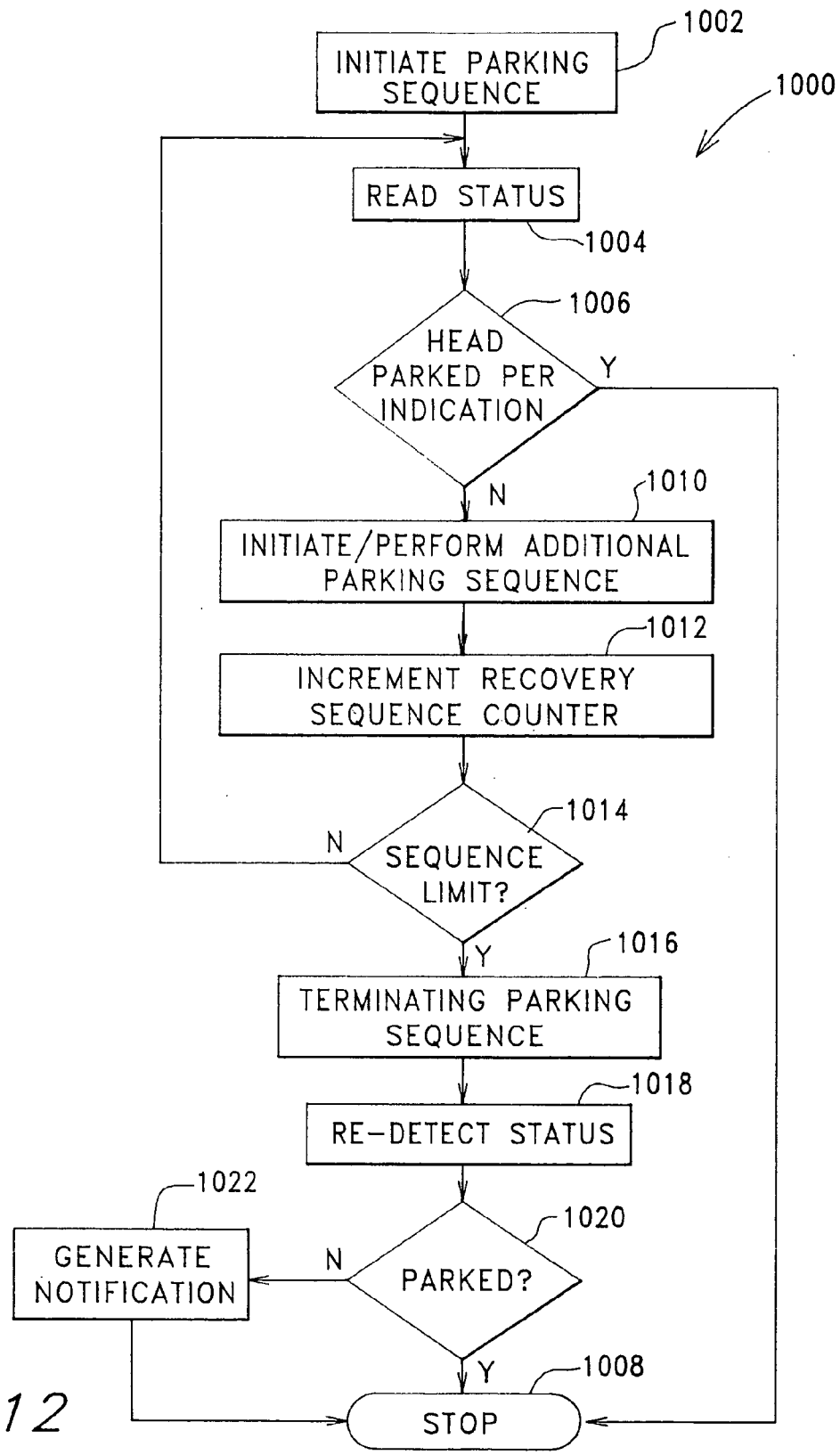
FIG. 12 is a flow diagram illustrating one possible implementation of an advanced parking control and monitoring sequence performed in accordance with the present invention and utilizing the head position sensing arrangement of the present invention.

Turning now to FIG. 12, an advanced parking control and monitoring sequence, performed in accordance with the present invention, is generally indicated by the reference number 1000. Method 1000 is performed by processing arrangement 302 within device 300. It should be appreciated, however, that the method is readily adapted for use in any form of hard disk drive arrangement. Method 1000 begins with step 1002 in which a parking sequence is initiated. The parking sequence employed may utilize parameters having values identified and selected, for example, using highly advantageous calibration procedure 800 described above.

Again, any suitable parking algorithm may be employed within the overall context of this method. Following step 1002, in step 1004, the processing arrangement reads the positional status of the head arrangement. Step 1006 then produces an indication based on this read. The indication may be provided in a wide variety of different ways. In one feature, an interrupt may be generated for receipt by the processing arrangement. In another highly advantageous feature, the indication is produced and stored in a register. The latter may be located within the Storage Element itself for subsequent access by the processing arrangement. Alternatively, the register may be located at any suitable location within the overall device so long as the processing arrangement has access thereto. This read may be performed in any suitable manner. For example, the processing arrangement may directly read the head position sensing arrangement. As an alternative, register 610 described with respect to FIG. 3 may be read. If the indication, for example, per the x and y bits of register 610, shows the head arrangement to be properly parked, stop step 1008 is executed.

If, on the other hand, the bits indicate that the head arrangement is not parked, step 1010 is performed in which an additional parking sequence is executed using the same parameter settings. Thereafter, step 1012 increments a recovery sequence counter (not shown). As will be seen, the recovery sequence counter counts the number of times that the parking sequence is repeated using its initial set of parameters. Step 1014 then tests the number of times which the parking sequence has been repeated. This sequence continues until the limit is encountered. The limit may be set, for example, in the range from 1 to any useful number of attempts.

Once the limit has been encountered, step 1016 performs a terminating parking sequence which is different from the parking sequence that is employed in the initial part of the method. The terminating parking sequence may be developed in view of a number of different considerations. For example, terminating parking sequence may vary the parameter settings in view of the bit settings in register 610. Specifically, as mentioned above, if one of the bits is set, while the other bit is not set, the head arrangement has most likely bounced off of the parking arrangement. Accordingly, the parameter corresponding to the voice coil motor drive current may be reduced in magnitude for purposes of the terminating parking sequence. On the other hand, if both of the bits are not set, the head arrangement has most likely not reached the parked position by virtue of lack of momentum. Therefore, the parameter corresponding to the voice coil motor drive current may be increased in magnitude for use in the terminating parking sequence. Following step 1016, step 1018 again tests the status of the head arrangement's position.

While steps 1016 and 1018, in combination, illustrate the terminating parking sequence as a one pass-through procedure for purposes of clarity and for facilitating brevity of this discussion, it is to be understood that this terminating parking sequence may encompass a repetitive process which bears some relationship to the calibration procedure of method 400 described above. That is, parameter magnitudes may be varied in incremental steps with repetition of the parking sequence, accompanied by testing the result of each variation.

Step 1020 performs a final check of the head arrangement position. If a parked indication is obtained, the procedure may terminate at stop step 1008. If the indication continues to show that the head arrangement is not parked, step 1022 generates a notification indicating to the device user that a problem has been encountered which is apparently unrecoverable. The notification may be provided in any suitable form such as, for example, in an audio and/or visual form. The foregoing procedure may be modified to suit any number of operational considerations. For example, the number of times that the parking sequence is repeated with any configuration of its parameters may be controlled, at least in part, by time constraints imposed through the overall operation of the device. Still further steps may be added to the overall process with the intent of enhancing the probability of survival of the Storage Element or other such hard disk drive type device. For example, following failure of the terminating parking sequence to achieve an indication that the head arrangement is parked, the voice coil motor drive signal may be issued at a level which is intended to hold the transducer(s) of the head arrangement just outside the outer diameter of the magnetic media.

Having described the head position sensing arrangement of the present invention and its use in a number of highly advantageous processes, it will be appreciated that the present invention provides sweeping advantages over the state-of-the-art. As is the case with any of the methods described herein, the ordered sequence of steps and specific design of individual steps and/or combinations thereof which make up method 1000 are considered to be within the scope of the present invention, as modified by one having ordinary skill in the art in view of this disclosure.

Figure 13:
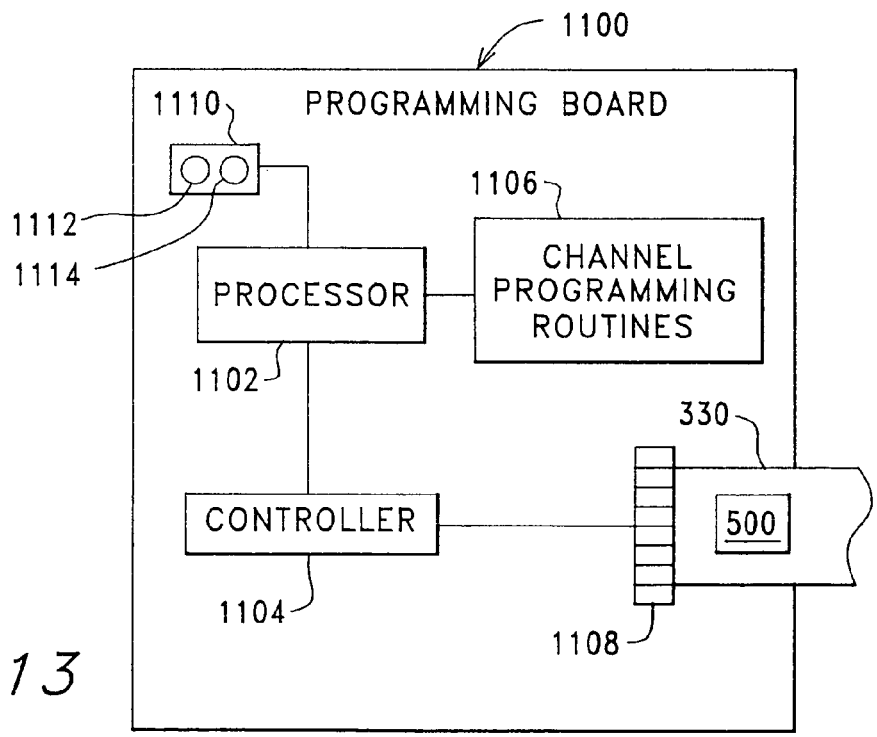
FIG. 13 is a block diagram of a test/programming board produced in accordance with the present invention and interfaced with the Storage Element (partially shown) of the present invention during manufacturing procedures.

Referring to FIG. 13 in conjunction with FIG. 2, attention is now directed to a highly advantageous test/programming board, generally indicated by the reference number 1100. Board 1100 includes a processor 1102, a controller 1104, a channel programming routines section 1106 and a connector 1108 configured for temporarily accepting the free end of flexible circuit 330 (partially shown) during the manufacturing process. Previously described connector 332 may be used as connector 1108, provided that it will accommodate repeated connect and disconnect cycles. In this regard, board 1100 is physically configured for temporary mating with Storage Element 320 during manufacturing for the purpose of customizing channel IC 500. This physical connection may be accomplished, for example, using plastic clips. Because the physical arrangement of board 1100 and Storage Element 320 may be accomplished in an unlimited number of ways, within the capability of one having ordinary skill in the art, a particular physical arrangement has not been illustrated. For example, an electrical interconnection arrangement may include a first portion forming one part of the Storage Element and having a second portion forming another part of the test/programming board for detachably electrically connecting the digital storage arrangement to the programming arrangement. In one embodiment, one of the first and second portions of the said interconnection arrangement may include a set of resilient contact members and the other one of the first and second portions may include a set of contact pads electrically connectable with the resilient contact members for use in programming the channel.

Channel programming routines section 1106 comprises an appropriate form of memory (e.g., ROM in combination with RAM) loaded with programming for execution by processor 1102 to issue native code instructions to controller 1104. The latter is configured in essentially the same manner as a prior art hard drive controller. That is, controller 1100 is configured to execute the native code of Storage Element 320 as a requirement to customizing channel IC 320. It should be appreciated that board 1100 is configured to complete its customization and test functions in an automated manner, thereafter, to provide a result from processor 1104 using an indication section 1110. As an example, a green light 1112 and a red light 1114 may give a pass/fail indication as to the status of the particular Storage Element. More detailed information may be provided, as desired, by using an LCD display (not shown), for example, to isolate problematic manufacturing concerns.

Still referring to FIGS. 2 and 13, having described test board 1100 and its general use with Storage Element 320, a number of associated advantages and features will now be described. It is important to appreciate that the functionality required to customize channel IC 500 is not required in device 300. The customization process need only be performed one time during manufacturing since the customized channel, in accordance with the present invention, remains with the Storage Element. This feature results in savings with regard to manufacturing costs associated with device 300. Moreover, any functionality of controller 1104 directed to the customization and testing process are not needed in device 300. The reader will recall that processing arrangement 320 of device 300 executes the native code of the Storage Element. Essentially, processing arrangement 302 serves in one role as a controller, without the need for test functionality which is needed in controller 1104. In this regard, any requirements for an upgraded processor in the end device, in order to execute channel programming, are avoided. It should be appreciated that the present invention contemplates a pre-existing compatibility between prior art devices and the Storage Element of the present invention. That is, as described above, processing power dedicated to the operation of the Storage Element may be deliberately limited to unused capabilities of processors already present in the architecture of a particular device. At the same time, the teachings of the present invention are readily practiced in "upgraded" devices, yet to be developed, in a way which provides even further performance enhancements in these devices.

Another advantage, with regard to test board 1100 and which is directly applicable to consideration of cost-reduction, is found on the basis that a limited number of test boards are needed within the context of any one overall manufacturing process. That is, the required number of test boards is limited by the number of Storage Elements available for channel programming at any one point in time. In this way, a single test board may be used over time to channel program and test a great number of Storage Elements. It should be appreciated that, in the absence of this arrangement, savings attendant to elimination of the need for a controller in Storage Element 320 would be offset wherein a test board was usable on only a single or very limited number of occasions.

A further advantage is provided by the present invention due to its compatibility with traditional manufacturing and test procedures. In particular, only two, almost insignificant steps are added to the manufacturing process in which test board 1100 is first physically connected with a Storage Element and then, after channel programming and testing, disconnected from that Storage Element. In this regard, it should be appreciated that cost savings provided in an end use device can be far outweighed where a sufficiently significant revamping of the manufacturing process is needed to produce that cost savings.

Since the Storage Element, devices in which the Storage Element is used and associated method disclosed herein may be provided in a variety of different configurations and the method may be practiced in a variety of different ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. A host device comprising:
an electromechanical data storage arrangement configured to perform, directly and without discretion, one or more tasks upon receipt of an executable native code instruction;
a host processor associated with memory, the memory storing both device code and native code, the native code including the native code instruction, the host processor configured to execute the device code for controlling the host device and configured to control the electromechanical data storage arrangement without intervening protocol layers using the native code by transmitting the executable native code instruction to the electromechanical data storage arrangement; and
a user interface, the user interface configured to receive a first user interaction, the first user interaction identifying a first set of data located on the electromechanical data storage arrangement, the host processor configured to transmit the native code instruction in response to the at least partially completed first user interaction;
wherein the first user interaction occurs over a first user interaction time period, the first user interaction time period comprises a data identification point whereat the first set of data is identified, and the host processor transmits the native code instruction in response to the partially-completed first user interaction before the data identification point.

2. The host device of claim 1 wherein the electromechanical data storage arrangement comprises a rotatable media and a motor arrangement configured to rotate the rotatable media and the one or more tasks comprise starting and stopping of the rotation of the rotatable media using the motor arrangement.

3. The host device of claim 2 wherein the one or more tasks comprise reading from the rotatable media.

4. The host device of claim 3 wherein the one or more tasks comprise writing to the rotatable media.

5. The host device of claim 2 wherein the electromechanical data storage arrangement comprises a sensing arrangement configured for movement to access the rotatable media during rotation and wherein the one or more tasks comprise moving the sensing arrangement.

6. The host device of claim 2 wherein the one or more tasks comprise rotating the rotatable media.

7. The host device of claim 1 wherein the host processor is configured to direct, through transmission of one or more native code instructions, the electromechanical data storage device to begin and complete transferring the first set of data during the first user interaction time period.

8. The host device of claim 7 wherein the first user interaction identifies a second set of data located on the electromechanical digital data storage device and the host processor is configured to direct, through transmission of one or more native code instructions, the electromechanical data storage device to begin and complete transferring the second set of data during a second user interaction.

9. The host device of claim 8 wherein the second user interaction identifies a third set of data located on the electromechanical data storage arrangement and the host processor is configured to direct, through transmission of one or more native code instructions, the electromechanical data storage device to begin and complete transferring the third set of data during the second user interaction.

10. The host device of claim 1 further comprising an electronic memory arrangement, the electronic memory arrangement comprising a capacity, and wherein the first set of data is larger than the capacity of the electronic memory, and the host processor is configured to direct, through transmission of one or more native code instructions, the electromechanical data storage arrangement to substantially fill the electronic memory arrangement with an initial portion of the first set of data.

11. The host device of claim 10 wherein the host device is configured to use the electronically stored data in a predetermined way and the host processor is configured to track the use of the initial portion of the first set of data from the electronic memory arrangement.

12. The host device of claim 11 wherein the host processor is configured to direct, through transmission of one or more native code instructions, the electromechanical data storage arrangement to replace the used part of the initial portion of the first set of data in the electronic memory arrangement with a second portion of the first set of data during a second user interaction.

13. A host device comprising:
an electromechanical data storage arrangement configured to perform, directly and without discretion, one or more tasks upon receipt of an executable native code instruction; and
a host processor associated with memory, the memory storing both device code and native code, the native code including the native code instruction, the host processor configured to execute the device code for controlling the host device and configured to control the electromechanical data storage arrangement without intervening protocol layers using the native code by transmitting the executable native code instruction to the electromechanical data storage arrangement;
wherein the electromechanical data storage arrangement comprises a rotatable media and a motor arrangement configured to rotate the rotatable media and the one or more tasks comprise starting and stopping of the rotation of the rotatable media using the motor arrangement;
wherein electromechanical data storage arrangement is relatively more susceptible to damage from mechanical shock in a first state than in a second state, and where the electromechanical data storage arrangement is configured to read and write to the rotatable media only from the first state; and
wherein the host processor is configured to direct, through transmission of one or more native code instructions, the electromechanical data storage arrangement to be in the first state only during a user interaction.

14. The host device of claim 13 wherein the user interaction comprises a multi-input portion and a held portion, and wherein the host processor is configured to direct, through transmission of one or more native code instructions, the electromechanical data storage arrangement to enter the first state after the initiation of the held portion.

15. The host device of claim 14 wherein the host processor is configured to direct, through transmission of one or more native code instructions, the electromechanical data storage arrangement to exit the first state if the held portion of the user interaction ends.

16. A method comprising:
providing an electromechanical data storage arrangement configured to perform, directly and without discretion, one or more tasks upon receipt of one or more native code instructions;
providing a host device comprising a host processor, memory and a user interface, the memory storing device code for controlling the host device and storing native device code configured for directly controlling the electromechanical data storage arrangement;
executing a control program using the host processor, the control program controlling the host device, the control program comprising native control device code executed to directly interface with the storage arrangement using one or more native code instructions;
transmitting the one or more native code instructions from the host processor to the electromechanical data storage arrangement, the one or more native code instructions traveling between the host processor and the electromechanical data storage arrangement without interpretation through intervening high-level protocol layers; and
receiving a first user interaction at the user interface, the first user interaction identifying a first set of data;
wherein transmitting the one or more native code instructions occurs in response to the partially-completed user interaction received at the user interface; and
wherein receiving the first interaction occurs over a first user interaction time period, the first user interaction time period comprises a data identification point whereat the first set of data is identified, and wherein transmitting the one or more native code instructions occurs before the data definition point.

17. The method of claim 16, wherein the electromechanical data storage arrangement comprises a rotatable media and a motor arrangement configured to rotate the rotatable media, further comprising:
starting and stopping the rotation of the rotatable media by the electromechanical data storage arrangement in response to the reception of the one or more native code instructions.

18. The method of claim 17 further comprising reading from the rotatable media.

19. The method of claim 18 further comprising writing to the rotatable media.

20. The method of claim 17, wherein the electromechanical data storage arrangement further comprises a sensing arrangement configured for movement to access the rotatable media during rotation, further comprising:
moving the sensing arrangement by the electromechanical data storage arrangement.

21. The method of claim 17 further comprising rotating the rotatable media.

22. The method of claim 16 further comprising beginning and completing a transfer of the first set of data during the first interaction time period.

23. The method of claim 22, wherein the first user interaction identifies a second set of data located on the electromechanical digital data storage device, further comprising:
directing, through transmission of one or more native code instructions, the electromechanical data storage device to begin and complete transferring the second set of data during a second user interaction.

24. The method of claim 23, wherein the second user interaction identifies a third set of data located on the electromechanical data storage arrangement, further comprising:
directing, through transmission of one or more native code instructions, the electromechanical data storage device to begin and complete transferring the third set of data during the second user interaction.

25. The method of claim 16, wherein the host device further comprises an electronic memory arrangement having a capacity and the first set of data is larger than the capacity of the electronic memory arrangement, further comprising:

directing, through transmission of one or more native code instructions, the electromechanical data storage arrangement to substantially fill the electronic memory with an initial portion of the first set of data.

26. The method of claim 25 further comprising using the electronically stored initial portion in a predetermined way and tracking the use of the initial portion.

27. The method of claim 26 further comprising directing, through transmission of one or more native code instructions, the electromechanical data storage arrangement to replace the used part of the initial portion of the first set of data in the electronic memory arrangement with a second portion of the first set of data during a second user interaction.

28. A method comprising:

providing an electromechanical data storage arrangement configured to perform, directly and without discretion, one or more tasks upon receipt of one or more native code instructions, the electromechanical data storage arrangement being relatively more susceptible to damage from mechanical shock in a first state than in a second state, and the electromechanical data storage arrangement being configured to read and write to the rotatable media only from the first state;

providing a host device comprising a host processor and memory, the memory storing device code for controlling the host device and storing native device code configured for directly controlling the electromechanical data storage arrangement;

executing a control program using the host processor, the control program controlling the host device, the control program comprising native control device code executed to directly interface with the storage arrangement using one or more native code instructions;

transmitting the one or more native code instructions from the host processor to the electromechanical data storage arrangement, the one or more native code instructions traveling between the host processor and the electromechanical data storage arrangement without interpretation through intervening high-level protocol layers; and directing, through transmission of one or more native code instructions, the electromechanical data storage arrangement to be in the first state only during a user interaction.

29. The method of claim 28 wherein the first user interaction comprises a multi-input portion and a held portion, and further comprising:

directing, through transmission of one or more native code instructions, the electromechanical data storage arrangement to enter the first state after the initiation of the held portion.

30. The method of claim 29 further comprising directing, through transmission of one or more native code instructions, the electromechanical data storage arrangement to immediately enter the second state if the held portion of the first user interaction ends while the electromechanical data storage arrangement is in the first state.

31. A host device comprising:

an electromechanical data storage arrangement having a rotatable media;

a host processor, the host processor configured to exchange data with the electromechanical data storage arrangement; and a user interface, the user interface configured to receive a first user command, the first user command identifying a first set of data located on the electromechanical data storage arrangement that is relatively more susceptible to damage from mechanical shock in a first state than in a second state, and the electromechanical data storage arrangement configured to read and write to the rotatable media only from the first state, the host processor configured to transmit an initiation instruction to the electromechanical data storage arrangement to initiate data transfer therefrom in response to the at least partially completed first user command;

wherein the first user command occurs over a first user interaction time period, the first user interaction time period comprises a data identification point whereat the first set of data is identified, and the host processor transmits the initiation instruction in response to the partially-completed first user command before the data identification point;

wherein the user interface is configured to receive the user command as a command initiation, followed by the data identification point, followed by a conclusion of command entry; and wherein the host processor is configured to place the electromechanical data storage arrangement in the second state before conclusion of command entry.

32. The host device of claim 31, wherein:

the user interface is configured to receive a user instruction to display a menu including a play option;

the host processor is configured to instruct the electromechanical data storage arrangement to transfer data therefrom upon user selection of the play option; and the host processor is configured to transmit the initiation instruction upon receipt of the user instruction to display the menu and prior to user selection of the play option.

33. The host device of claim 31, wherein the user interface is configured to disable the conclusion of command entry until the first set of data is transferred from the electromechanical data storage arrangement.

34. The host device of claim 33, wherein the user interface is configured to disable the conclusion of command entry by at least one of not displaying a play input and not displaying the play input as enabled.

35. A host device comprising:

an electromechanical data storage arrangement that is relatively more susceptible to damage from mechanical shock in a first state than in a second state, and the electromechanical data storage arrangement including a sensor arrangement configured to read and write to the rotatable media only from the first state;

a user interface configured to receive user interaction including data transfer instructions including a data identifier identifying data to be read from or written to the rotatable medium over a time period; and a host processor coupled to the user interface and configured to cancel transfer of the data identified by the data identifier of a data transfer instruction received on the user interface if user interaction with the user interface occurs for less than the time period, the host processor being further configured to immediately move the sensor arrangement to an unloaded, parked position if the user interaction with the user interface occurs for less than the time period.

36. The host device of claim 35, wherein the host device comprises a wireless device and the host processor is configured to cause the host device to wirelessly retrieve messages comprising one or more of voice messages and email messages only if user contact with the user interface is occurring or an electronic memory operatively coupled to the host processor has sufficient memory to store the messages.

37. The host device of claim 35, wherein the host processor is configured to enable reading from and writing to the electromechanical data storage arrangement only while a user supplies a continuous input to the user interface.

38. The host device of claim 35, wherein the user interaction includes a first user contact including data transfer instructions and one or more subsequent user contacts separated from the first user contact by a period in which no user contacts occur, the host processor configured to store the data transfer instructions and to execute a portion of the data transfer instructions by reading and writing to the rotatable medium during the one or more subsequent user contacts.

39. A host device comprising:
   an electromechanical data storage arrangement configured to perform, directly and without discretion, one or more tasks upon receipt of an executable native code instruction;
   a host processor associated with an electronic memory, the host processor configured to exchange data with the electromechanical data storage arrangement and to store the data in the electronic memory, the host processor configured to control the electromechanical data storage arrangement without intervening protocol layers by transmitting the executable native code instruction to the electromechanical data storage arrangement; and
   a user interface, the user interface configured to receive user commands occurring over a user interaction time period, the user interaction time period comprising a data identification step whereat a plurality of data files are identified, the host processor being configured to transmit an initiation instruction to the electromechanical data storage arrangement prior to completion of the data identification step and after sufficient data files of the plurality of data files have been identified to fill a predetermined portion of the electronic memory.

40. The host device of claim 39, wherein the electromechanical data storage arrangement is a hard disk drive configured to respond to the initiation instruction by spinning up a hard disk.

41. The host device of claim 39, wherein the host processor is configured to monitor the user commands and to generate a predicted time at which sufficient data files will be identified to file the predetermined portion of the electronic memory, the processor further configured to generate the initiation instruction at the predicted time.

* * * * *